United States Patent [19]

Steiger

[11] 4,266,977

[45] May 12, 1981

[54] SUBMICRON CARBON-CONTAINING TITANIUM BORIDE POWDER AND METHOD FOR PREPARING SAME

[75] Inventor: Roger A. Steiger, Canal Fulton, Ohio

[73] Assignee: PPG Industries, Inc., Pittsburgh, Pa.

[21] Appl. No.: 966,526

[22] Filed: Dec. 4, 1978

Related U.S. Application Data

[63] Continuation-in-part of Ser. No. 546,835, Feb. 3, 1975, abandoned.

[51] Int. Cl.$^3$ .............................................. C04B 35/58
[52] U.S. Cl. ....................................... 106/43; 106/56; 75/238
[58] Field of Search ..................... 106/43, 56; 264/332; 75/238

[56] References Cited

U.S. PATENT DOCUMENTS 3,979,500  9/1976  Shepparo .............................. 423/297

FOREIGN PATENT DOCUMENTS 29-9052  5/1954  Japan ......................................... 106/43
1010492  2/1963  United Kingdom ..................... 264/332

Primary Examiner—G. O. Peters
Attorney, Agent, or Firm—Irwin M. Stein

[57] ABSTRACT

Submicron carbon-containing titanium diboride powder and other hard, refractory metal boride powders, such as zirconium diboride and hafnium diboride powders, are prepared by vapor phase reaction of the corresponding metal halide, e.g., titanium halide, vaporous carbon source, and boron source reactants in the presence of hydrogen in a reaction zone and in the substantial absence of oxygen, either combined or elemental. In a preferred embodiment, the metal halide, e.g., titanium tetrachloride, carbon source, e.g., halogenated hydrocarbon, and boron source, e.g., boron trichloride, reactants are mixed with a hot stream of hydrogen produced by heating hydrogen in a plasma heater. The reaction zone is maintained at metal boride forming temperatures and submicron solid, carbon-containing metal boride powder is removed promptly from the reactor and permitted to cool. The preponderant number of metal boride particles comprising the powder product have a particle size in the range of between 0.05 and 0.7 microns. The metal boride powder product contains a minor amount of carbon, e.g., from above 0.1 to about 5 percent by weight total carbon. Alternatively, submicron metal carbide powders, e.g., titanium, zirconium, hafnium or boron carbide powders, or finely-divided carbon can be blended physically with submicron metal boride powder prepared as described above but in the absence of the carbon source reactant to provide metal borides containing a minor concentration of carbon in the amounts previously indicated. The above described carbon-containing titanium diboride powder compositions can be hot pressed, or cold pressed and sintered to articles having densities of at least 95 percent of theoretical. Such articles can be used as current conducting elements, e.g., cathodes, in electrolytic cells for production of aluminum.

28 Claims, 8 Drawing Figures

SUBMICRON CARBON-CONTAINING TITANIUM BORIDE POWDER AND METHOD FOR PREPARING SAME

CROSS REFERENCE TO RELATED APPLICATION

This application is a continuation-in-part application of my pending application U.S. Ser. No. 546,835, filed Feb. 3, 1975 for "Sub-Micron Carbon-Containing Titanium Boride Powder and Method for Preparing Same", now abandoned.

DESCRIPTION OF THE INVENTION

The literature describes a variety of methods for preparing hard refractory metal borides such as titanium diboride. For example, elemental titanium and boron can be fused together at about 3630° F. This method (synthesis by fusion) produces products that are relatively impure and requires isolation of the boride product by chemical treatment. Other sintering processes involve the reaction of elemental titanium with boron carbide (U.S. Pat. No. 2,613,154), the reaction of titanium hydride with elemental boron (U.S. Pat. No. 2,735,155), and the reaction of ferrotitanium and ferroboron alloys in a molten metal matrix, e.g., iron (U.S. Pat. No. 3,096,149). A fused salt bath containing an alkali metal or alkaline earth metal reducing agent and titanium-and boron-containing reactants has been used to produce titanium diboride (U.S. Pat. No. 3,520,656). U.S. Pat. No. 3,775,271 describes the electrolytic preparation of titanium and zirconium diborides by using a molten sodium salt electrolyte and rutile or zircon concentrates as the source of titanium and zirconium, respectively.

The preparation of the borides of titanium, zirconium, and hafnium by the vapor phase reaction of the corresponding metal halide, e.g., titanium tetrachloride, and a boron halide, e.g., boron trichloride or boron tribromide, in the presence of hydrogen at temperatures of from 1000°–1330° C., 1700°–2500° C., respectively, has been reported in *Refractory Hard Metals*, by Schwarzkopf and Kieffer, the MacMillan Company, N.Y., 1953, pages 277, 281 and 285. Typically, these vapor phase reactions have been conducted by heating the reactants in the presence of an incandescent tungsten filament. Such procedures, however, produce a coating of the metal boride on a heated substrate rather than a powdery product. The aforementioned vapor phase reaction for preparing titanium diboride has been conducted at temperatures less than 1200° C., using sodium vapor in lieu of hydrogen (U.S. Pat. No. 3,244,482).

A widely reported commercial process used for preparing refractory metal borides, e.g., titanium diboride, is the carbothermic process. In this process, refractory metal oxide, e.g., titanium dioxide, an oxide of boron, e.g., $B_2O_3$, and carbon are heated in an electric arc or high frequency carbon furnace. As an alternative to the electric arc furnace, it has been proposed to prepare titanium diboride by injecting powdered activated charcoal impregnated with boron oxide and titania (anatase) into an argon plasma (British Pat. Specification No. 1,273,523). This process describes producing about one gram of product in ten minutes and is not, therefore, considered commercially attractive. The product obtained from the aforementioned carbothermic process is ground in, for example, jaw-crushers and mills, and screened. To obtain a finely-divided product, extensive milling is required. For example, U.S. Pat. No. 3,052,538 describes the necessity for milling intermetallic compounds such as titanium diboride and titanium carbide to obtain a fine particle size useful for dispersion strengthening of titanium. A milling time of 300 hours (12½ days) in a porcelain mill using hardened steel balls as the grinding medium is recited as being required.

The reported average size of the product produced from such lengthy milling ranges from about 2 to about 10 microns. Moreover, the product is contaminated with impurities abraded from the materials of construction of the mill and grinding surface. Thus, it is common to find metallic impurities in the product such as tungsten, iron, chromium, cobalt, and nickel. Moreover, extensive milling produces a significant amount of ultrafine, i.e., less than 0.05 micron, fragments. These fragments are produced during milling and comprise irregular pieces of the principal particles that have been chipped or ground away from the edge or face of the particle. Thus, extensive milling produces particles having fractured irregular surfaces and a relatively large amount of fines.

It has now been discovered that submicron refractory metal boride powder, such as titanium diboride, zirconium diboride and hafnium diboride powders, that contain minor amounts of a carbon-containing additive can be produced by reacting in the vapor phase, the corresponding metal halide, e.g., titanium halide, boron source, e.g., boron hydride or boron halide, and carbon source, e.g., readily volatile hydrocarbons or halogenated hydrocarbons, reactants in the presence of hydrogen, e.g., a hot hydrogen gas stream produced by a hydrogen plasma heater, and in the substantial absence of oxygen, either combined or elemental. Preferably, hydrogen is heated in a plasma heater to form a highly heated hydrogen gas stream, which is introduced into the reactor and into the reaction zone. The metal halide, boron source, and carbon source reactants are introduced into the reactor and preferably into the hot hydrogen stream and the resulting reactant gas mixture permitted to react in a zone maintained at metal boride forming temperatures. The solid metal diboride formed is removed from the reactor, quenched, usually by indirect heat exchange means, and recovered in conventional fine particle collection equipment, e.g., cyclones, electrostatic precipitators, dust collectors, etc. When the metal halide is titanium halide, solid, submicron carbon-containing titanium diboride powder is produced, the titanium diboride particles of which are characterized by well developed individual crystals that have well developed faces. Substantially all, i.e., at least 90 percent, of the particles have a nominal sectional diameter of less than one micron. The preponderant number, i.e., greater than 50 percent, of the particles less than one micron are in the particle size range of between 0.05 and 0.7 microns. The powder product can be produced containing less than 0.25 weight percent oxygen and less than 0.20 weight percent halogen, e.g., chlorine.

By the aforementioned process, an intimate mixture of refractory metal boride powder containing carbon as free (elemental) carbon and/or chemically combined carbon, e.g., as submicron refractory metal carbide, is produced. The resulting powder composition, i.e., submicron refractory metal boride powder having dispersed therein a solid submicron carbon-containing additive, either as free (elemental) carbon, refractory metal carbide or both, can be cold pressed and sintered, or hot pressed to dense articles, e.g., articles having a density of at least 90 percent, more usually at least 95 percent, of the theoretical density for titanium diboride. Thus, coproduced powders of, for example, titanium diboride and titanium carbide and/or carbon in intimate admixture and in most any proportion can be prepared by the above-described process. For use in aluminum reduction or refining electrolytic cells, consolidated articles prepared from such refractory metal boride powder, e.g., titanium diboride, preferably contain between above 0.1 and about 5 weight percent of total carbon, which is the sum of the carbon present in the powder as free carbon and chemically combined carbon. For other uses, a boride powder product containing higher amounts of total carbon can be produced.

Alternatively, it has been found that submicron carbon-containing refractory metal boride powder compositions can be prepared by preparing the submicron titanium diboride powder as described, but in the absence of the carbon source reactant, and blending with the resulting powdered product the desired added amount of submicron carbon and/or refractory metal carbide. For example, submicron carbon or titanium carbide can be blended with submicron titanium diboride to produce powder compositions that have a carbon content of from above 0.1 to about 5 weight percent total carbon. Such compositions also can be cold pressed and sintered and hot pressed to articles having a density of at least 90 percent, more usually at least 95 percent, of the theoretical density for titanium diboride. Powdery compositions in which the carbon-containing additive is co-produced, i.e., formed simultaneously in the reactor with the metal boride, provide compositions in which the carbon-containing additive is more homogeneously dispersed throughout the metal boride powder. Consequently, less carbon-containing additive is required to produce the same results as when physical blends are used.

BRIEF DESCRIPTION OF THE DRAWINGS

The process described herein for preparing submicron refractory metal boride powder, submicron, carbon-containing refractory metal boride powder and articles prepared from such powder can be better understood by reference to the accompanying drawings and photomicrographs wherein.

DETAILED DESCRIPTION

Figure 1:
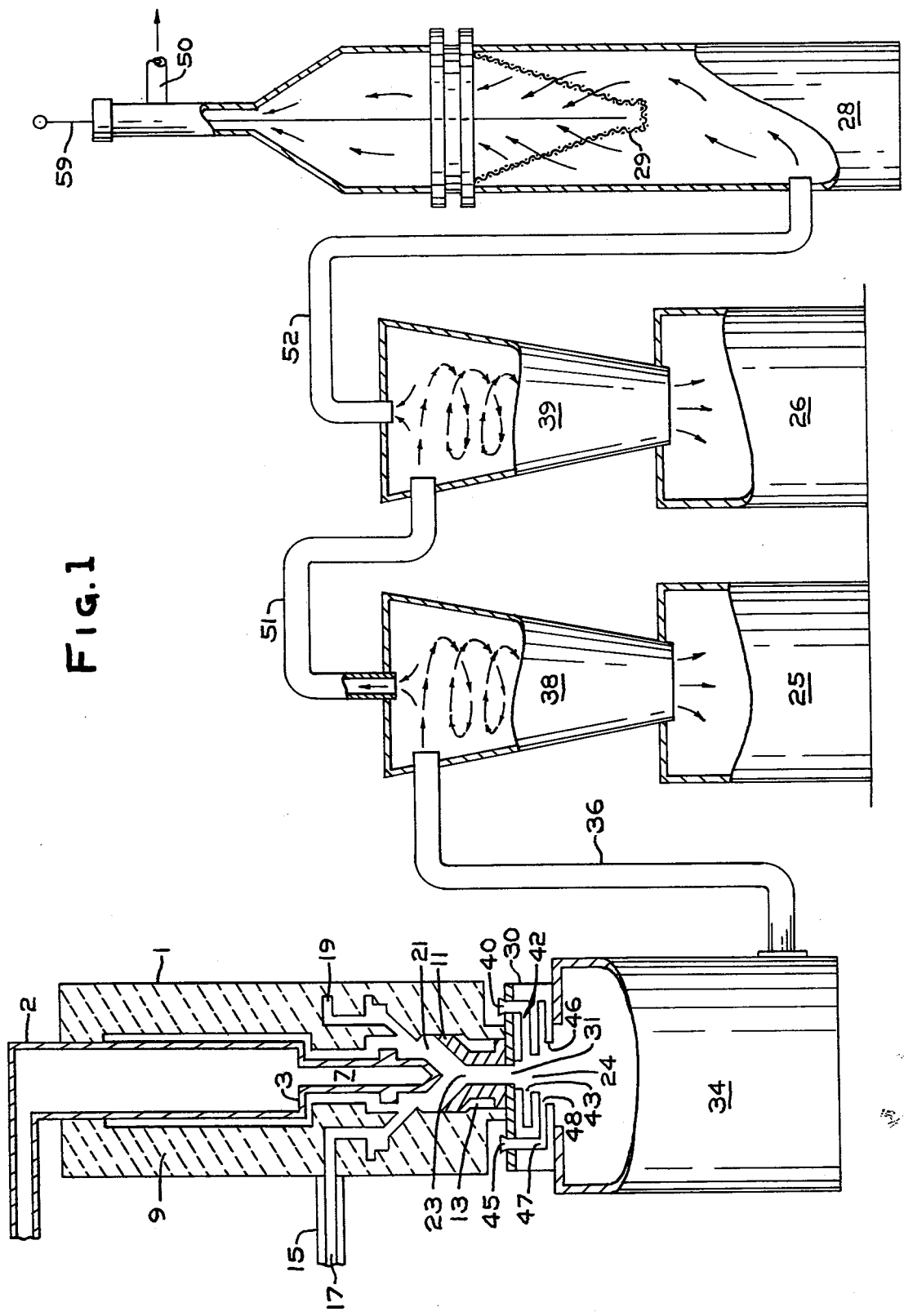
FIG. 1 is a diagram of an assemblage, partially broken away in section, comprising arc plasma gas heating means, two slot reactant mixer means for introducing reactants to the hot gas stream emanating from the plasma heater, reactor means, and auxiliary product recovery equipment means (cyclones and bag filter) for recovering the metal boride powder product suspended in the reactor gaseous effluent.

The present invention relates to submicron refractory metal boride powders having dispersed therein minor amounts of solid submicron carbon-containing additive, and particularly relates to submicron titanium diboride powder compositions that contain minor amounts of added carbon-containing additive and consolidated dense articles prepared from such compositions. It has been found that a submicron carbon additive, notably in the elemental form or in the form of metal carbides, aids the densification of submicron refractory metal boride powder compositions (promotes sintering) to the extent that the powder composition can be consolidated to highly dense articles by cold pressing and sintering. Thus, submicron titanium diboride containing as little as 1 weight percent submicron carbon additive can be cold pressed and sintered to densities of at least 90, e.g., 95 percent of the theoretical density for titanium diboride. As used herein with respect to metal boride powders or compositions, the terms "carbon" or "total carbon", unless otherwise defined, are intended to mean the carbon present therein both as elemental carbon and chemically combined carbon, e.g., as a metal carbide.

Consolidated articles prepared from submicron refractory titanium boride powder compositions which contain from above 0.1 to about 5 weight percent total carbon, preferably from above 0.1 to about 2 weight percent, e.g., 0.15 or 0.3 to 1 or 2 weight percent, more preferably, about 1 weight percent, total carbon based on titanium diboride are especially useful in aluminum reduction or aluminum refining cells. From the evidence at hand, it is believed that a total carbon content of at least about 0.3 weight percent will provide a substantially uniform microstructure in hot pressed or cold pressed and sintered articles prepared from such powder compositions. For other uses, refractory metal boride powders containing higher amounts of total carbon, e.g., to 10 weight percent or more, are contemplated. Thus, powder compositions (and articles prepared therefrom) containing from 0.1 to 10 weight percent total carbon are contemplated herein.

The carbon-containing additive can be introduced into the boride powder in any convenient manner, however, it is preferred that the carbon be introduced into the powder in the reactor when the metal boride power is being formed. Various advantages accrue when the carbon is introduced into the boride powder at that time. First, a more homogeneous distribution of carbon in the boride powder product results than can be achieved by physically blending. A homogeneous distribution of carbon throughout the boride powder hinders grain growth during sintering and helps provide a fine grain structure. A fine grain structure generally has greater strength than a coarse grained structure. Second, elimination of possible oxygen and metal contamination as a consequence of such blending is achieved. Third, the presence of ultrafine carbon particles in the reaction zone provides also a source of nuclei which often results in a boride powder product of higher surface area than a powder prepared in a reaction system that does not have such nuclei. Finally, it has been observed that less reactor added carbon is required to obtain the same degree of densification that is required with physically blended carbon. Results obtained with reactor added carbon compare favorably with those obtained using twice as much carbon that has been physically blended with preformed refractory metal boride. It is postulated that the essentially homogeneous dispersion of reactor added carbon throughout the refractory metal boride powder is a major reason for this result. Further, titanium diboride containing reactor added carbon provides a sintered article having an essentially equiaxed grain structure while titanium diboride containing physically blended carbon provides a sintered article having less pronounced equiaxed grains and more elongated grains.

Metal boride, e.g., titanium diboride, powder compositions containing from, for example, above 0.1 to 5 weight percent total carbon can be prepared also by blending physically submicron metal carbide powder, e.g., titanium carbide powder, and/or finely-divided carbon with submicron metal boride, e.g., titanium diboride powder in amounts sufficient to provide a total carbon level within the aforesaid range. Submicron titanium carbide and other metal carbides can be prepared by the processes exemplified by U.S. Pat. Nos. 3,485,586, 3,661,523, 3,761,576, and 3,340,020. Briefly, such processes comprise subjecting a halide of an element of the metals of the 3rd to the 4th group of the Periodic Table or the metalloids of the 3rd and 4th group and a hydrocarbon to the action of a hydrogen plasma. In Example I of U.S. Pat. No. 3,340,020, a mixture of tantalum pentachloride and methane was introduced into the flame of a hydrogen plasma and tantalum carbide having an average particle size of 0.01 micron and a B.E.T. surface area of 40-60 m$^2$/gram was reported produced. Generally, the submicron metal carbide, e.g., titanium carbide, used will have a number median particle size of between about 0.1 and 0.9 microns, although submicron metal carbides having a number average particle size of between 0.01 to 0.9 microns can be used. Usually, the added submicron refractory metal carbide will have substantially the same surface area, i.e., the same number average or number median particle size, as the refractory metal boride. Submicron carbon is commercially available and such materials can be used directly; a commercial carbon product having a particle size larger than desired can be used, preferably by first being reduced in size by grinding the carbon in conventional milling equipment, e.g., fluid energy mills. For example, commercially available N110 carbon black having a surface area of 11-19 m$^2$/gram can be used.

The carbon-containing additive can be present as elemental submicron (finely-divided) carbon; however, it is preferred that it be present as submicron refractory metal carbide powder, e.g., hafnium carbide, titanium carbide, tantalum carbide, zirconium carbide, boron carbide, silicon carbide, etc. The carbides of refractory metals of Groups 4b, 5b and 6b of the Periodic Table of the Elements (identified hereinafter) boron and silicon are contemplated. Mixtures of metal carbides can be used; but, usually the refractory metal of the carbide will be the same as the refractory metal of the boride. Identity of refractory metal between the metal boride and carbon-containing additive is not required. Thus, powder compositions such as titanium diboride powder containing carbon as hafnium carbide, tantalum carbide, zirconium carbide, boron carbide, silicon carbide, or mixtures thereof are contemplated. Other similar combinations of refractory metal boride powders and refractory metal carbide powders are also contemplated.

Figure 3:
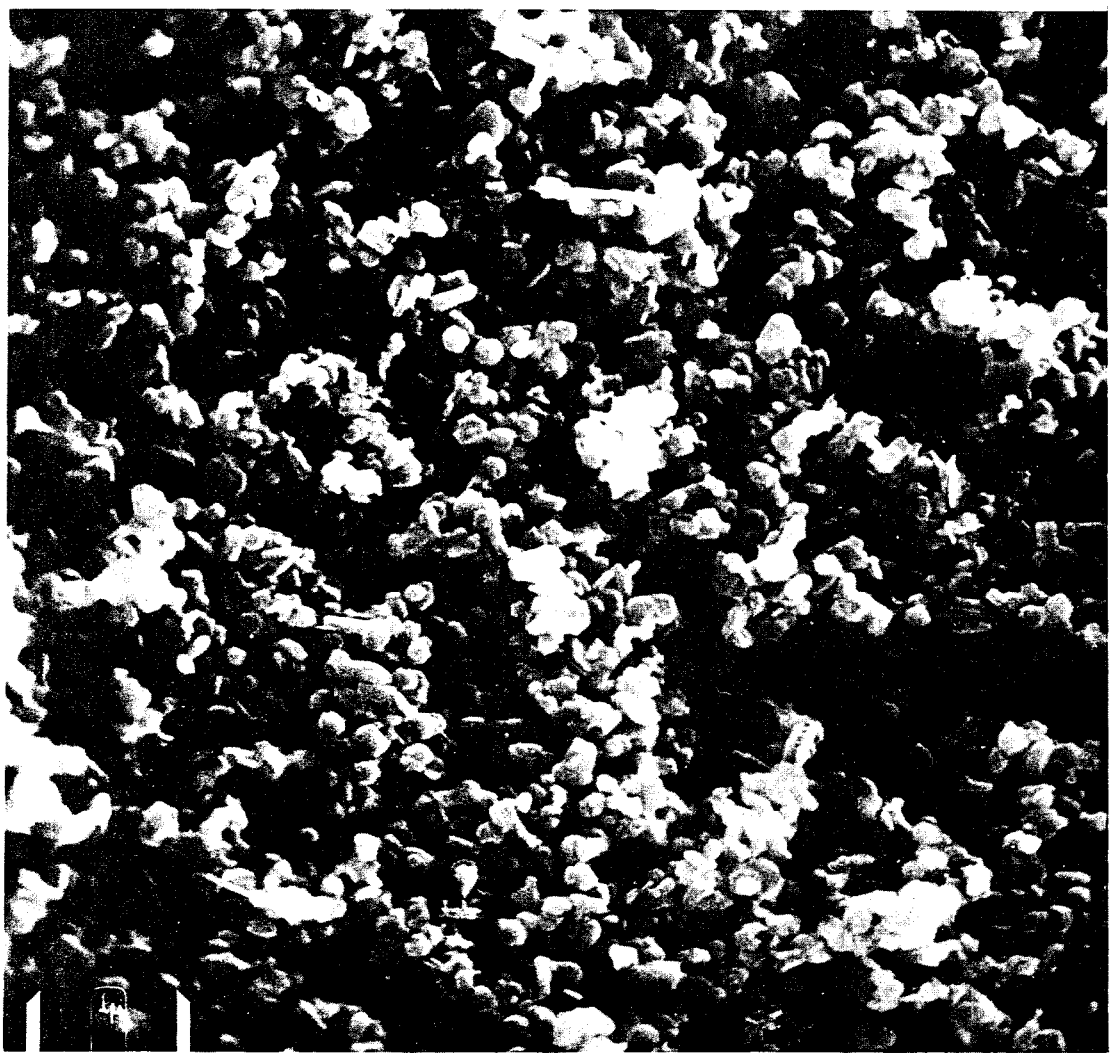
FIG. 3 is a scanning electron micrograph having a magnification factor of 25,000 of a sample of titanium diboride powder having a B.E.T. surface area of 11.5 square meters per gram that was prepared in a manner similar to that described in Example II.
Figure 4:
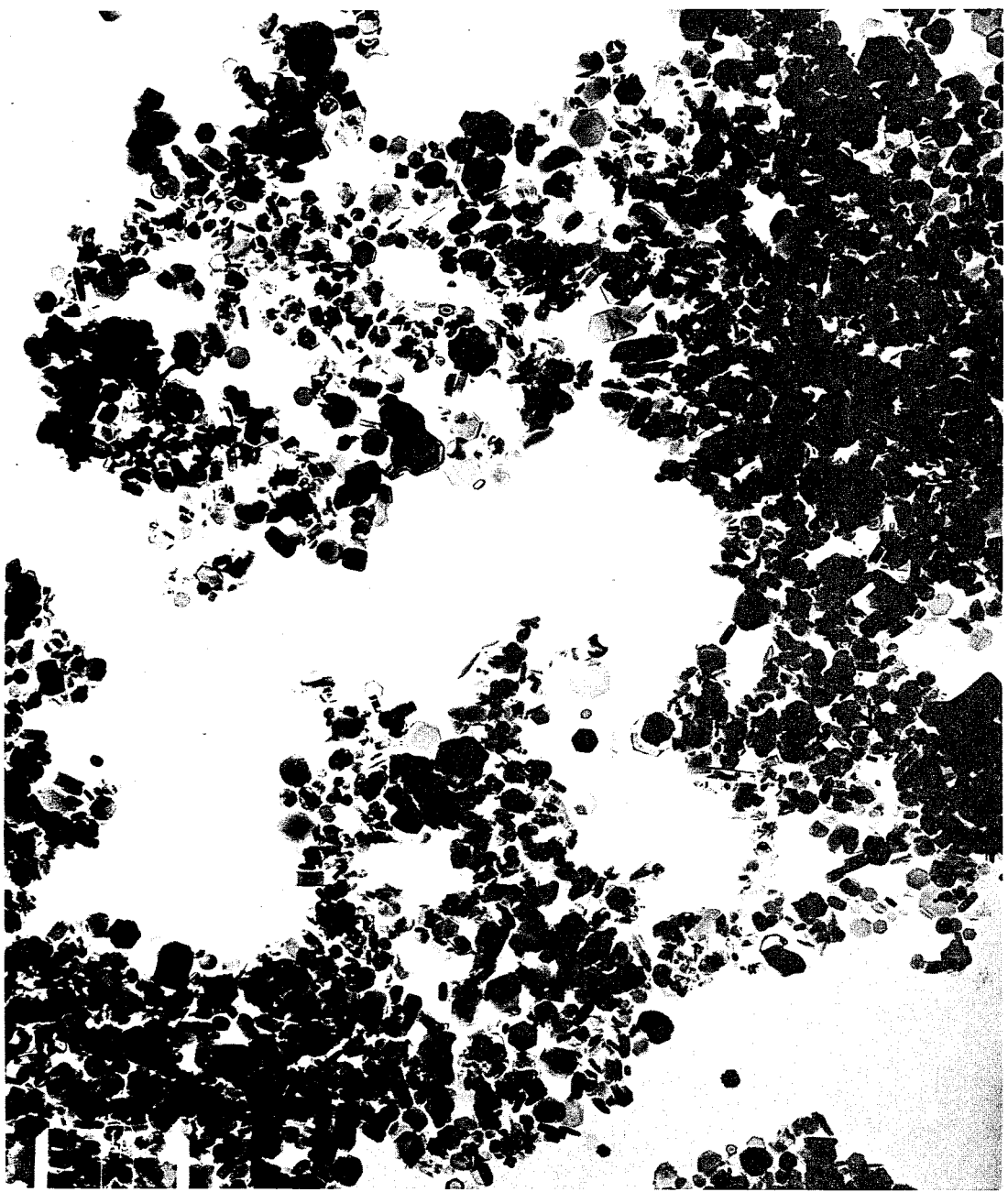
FIG. 4 is a transmission electron micrograph having a magnification factor of 25,000 of a sample of the titanium diboride described in connection with FIG. 3.

Refractory metal borides of Group 4b of the Periodic Table of the Elements (*Handbook of Chemistry and Physics*, 45th edition, published by The Chemical Rubber Co., 1964) prepared by the process described hereinafter, namely, titanium diboride, zirconium diboride and hafnium diboride, are grey to black powders composed predominantly of well developed crystals having well defined faces. FIGS. 3 and 4, which are electron micrographs (25,000 magnification) of submicron titanium diboride prepared in accordance with the present invention, show examples of the typical crystalline particles produced. The product contains varying proportions of equidimensional and tabular single crystals, which are freely dispersible by virtue of extremely limited crystal intergrowth. The equidimensional crystals are bounded either by planar crystal faces or smooth rounded surfaces. The tabular crystal forms consist dominantly of hexagonal prisms terminated by the basal pinacord. The tabular crystals are flattened perpendicular to the c—crystallographic axis as a result of greater development of the pinacoidal faces relative to the prism faces. Consequently, the crystal habit of the product can be described as tabular to equidimensional hexagonal. Based on visual observations of the powdery product through an electron microscope, the tabular hexagonal crystals exhibit a nominal sectional diameter to thickness ratio within the range of 1.5:1 to 10:1.

Submicron metal boride powders, e.g., titanium diboride, that can be prepared utilizing the process described in more detail hereinafter are substantially free of undesirable metal contaminants, i.e., the powders are essentially pure, as established by emission spectrographic analysis. Since carbon is added to or conformed with the metal boride powder, carbon is not considered an impurity.

Metal impurities (as elemental metal) normally represent less than 4,000 parts per million parts of the boride powder (ppm), i.e., less than 0.4 weight percent, and often represent less than 3,000 ppm (0.3 weight percent). Among the metals that can comprise the aforementioned impurities are the following: aluminum, barium, calcium, chromium, copper, iron, potassium, lithium, magnesium, manganese, sodium, nickel, silicon, vanadium and tungsten. The source of such metal impurities, if present, in the boride powder product is normally the reactants or equipment used to prepare the product.

Oxygen and halogen, e.g., chlorine, normally make up the largest individual non-metallic impurities that are introduced into the product from the reactants. By virtue of the described process, it is readily feasible to obtain boride powders with less than 0.20 weight percent halogen, e.g., chlorine, and less than 0.25 weight percent oxygen. By careful recovery, e.g., degasification, and handling techniques to avoid exposure of the boride powder product to the atmosphere (oxygen) or moisture, boride powders with less than 0.15, often less than 0.10, weight percent halogen, and less than 0.20, e.g., less than 0.15 weight percent oxygen, can be obtained. The aforementioned values for halogen and oxygen are based upon analysis for such impurities obtained by use of X-ray spectrographic analysis and by the use of a Leco oxygen analyzer, respectively. The aforementioned X-ray spectrographic technique analyzes principally for unreacted metal halides and subhalides present in the boride powder. Adsorbed hydrogen halide, e.g., hydrogen chloride, on the boride powder may not be detected by that technique.

Thus, despite the use of substantially pure reactants and careful handling and recovery techniques, a small amount of metal impurities, halogen and oxygen can be present in the boride product. When not added intentionally, carbon can also be found in the boride powder product; however, the carbon level is typically less than 0.1 weight percent. The total amount of the aforesaid impurities in the boride powder product (other than added amounts of carbon) is usually less than 1.0 weight percent, and typically is less than 0.75 weight percent. Stated another way, refractory metal boride powders of the present process that are produced in the absence of carbon source reactant are usually at least 99 percent pure and typically are at least 99.25 percent pure.

The metal boride powders produced by the present process, e.g., titanium boride, are, as indicated, predominantly submicron in size. The surface area of the boride product can vary between about 3 and about 35 square meters per gram ($m^2$/gram). More typically, the surface area will range between about 3 and about 25 $m^2$/gram or between about 3 or 4 and about 15 $m^2$/gram, e.g., between 5 and 10 $m^2$/gram, as measured by the method of Brunauer, Emmett, and Teller, J. Am. Chem. Soc., 60, 309 (1938). This method, which is often referred to as the B.E.T. method, measures the absolute surface area of a material by measuring the amount of gas adsorbed under special conditions of low temperature and pressure. The B.E.T. surface areas reported herein were obtained using nitrogen as the gas adsorbed and liquid nitrogen temperatures ($-196°$ C.) and a pressure of 150 mm of mercury (0.2 relative pressure).

The surface area of the boride powder is, of course, a function of the particle size of the boride particles produced, i.e., the smaller the particle size, the higher the surface area. The average spherical particle size diameter, in microns, of the refractory metal boride, e.g., titanium diboride, powder particles produced can be estimated roughly by the expression:

Average Spherical Particle size Diameter = 1.33/Surface Area ($m^2$/gram)

which assumes that each particle is a sphere (regular shaped polygon).

Using the aforesaid expression, the average spherical particle size diameter of metal boride powder having the range of surface areas described hereinabove can be calculated. Thus, boride powder of between 3 and 35 $m^2$/gram surface area has an average diameter of between about 0.4 and about 0.04 microns. Similarly, metal boride powders of between about 3 and 25 $m^2$/gram, between 3 or 4 and 15 $m^2$/gram and between 5 and 10 $m^2$/gram have average spherical particle size diameters of between 0.4 and 0.05, between 0.4 or 0.3 and 0.09, and between about 0.3 and 0.1 microns, respectively.

Substantially all, i.e., at least 90 percent (by number) of the metal boride particles comprising the boride powder composition of submicron, i.e., have a nominal sectional diameter of less than one micron. The nominal sectional diameter is the nominal diameter of a particle viewed under high magnification, e.g., 25,000 magnification, such as seen by an electron microscope and depicted in electron micrographs. The nominal diameter is based on the two dimensional surface viewed under high magnification. The preponderant number, i.e., greater than 50 percent, of the particles less than one micron are in the particle size range of between 0.05 and 0.7 microns. Particles as small as 0.03 microns and as large as 2 microns can be present in the powdery product; but, particles greater than 2 microns rarely represent more than one percent by number of the product. The aforesaid crystalline particles less than 0.05 microns are distinguishable from the ultrafine fragments less than 0.05 microns found in metal diboride powder that has been milled extensively. The metal diboride powders described herein are substantially free of fragments less than 0.1 micron, e.g., the ultrafine fragments less than 0.05 microns.

It is estimated from a study of the refractory metal boride powders of the present invention with a Zeiss TGZ-3 Particle Size Analyzer that at least 60 percent on a number basis, more usually at least 70 percent, e.g., 98 percent, of the boride particles comprising the powder are 0.7 microns or less. It is not uncommon to find that the aforesaid percentages represent also the particles within the particle size range of between 0.05 and 0.7 microns. It is estimated further that less than 10 percent on a number basis of the boride particles are greater than 1 micron. The aforementioned values respecting the percentage of boride particles 0.7 microns or less depends on the particle size distribution of the powder. Generally, the particle size distribution is relatively narrow. The number median particle size of the boride particles comprising the boride powder composition is usually between about 0.08 and about 0.6 micron, more usually between 0.1 and 0.5 microns, and varies directly with the surface area of the powder. Because of its high surface area, the metal boride powder tends to adsorb readily oxygen or moisture.

The refractory metal boride powders of the present invention are useful when consolidated into dense articles as current conducting elements, e.g., as high temperature electrical conductors, as electrodes in metal manufacturing and refining such as aluminum manufacture. The relatively low electrical resistivities of consolidated shapes prepared from these boride powders make them especially desirable as electrical conductors and electrodes. Moreover, it has been found that the electrical resistivity of hot pressed or cold pressed and sintered forms prepared from the boride powder products, e.g., titanium diboride, produced in accordance with the process described herein are lower than values reported in the literature. For example, electrical resistivity values for titanium diboride have been reported as being greater than 10 microhm centimeters, e.g., from 10 to 30 microhm centimeters and typically from 15 to 25 microhm centimeters. In contrast, hot pressed or cold pressed and sintered titanium diboride forms prepared from titanium diboride powder compositions produced in accordance with the present invention are typically less than 10 microhm centimeters, e.g., usually from 5 to 9 microhm centimeters at room temperature. The electrical resistivity of titanium diboride forms of the present invention can be higher than 10 microhm centimeters, e.g., 10 to 15 or even as high as 20 or 25 microhm centimeters, without affecting the utility of such forms, e.g., as current conducting elements. The electrical resistivity of zirconium diboride and hafnium diboride prepared in accordance with the present invention can be also less than 10 microhm centimeters at room temperature, i.e., 25° C.

Electrical resistivity can be measured in the conventional manner. Briefly, such measurement is obtained by applying direct current from two electrodes across the specimen to be measured, e.g., a square or rectangular plate, and the potential (voltage) difference between two points on the specimen equidistance from the electrodes recorded by an electrometer. For example, a 2 inch ×2 inch ×½ inch refractory metal boride plate is clamped at the ½ inch side between two copper electrodes and a direct current applied across the plate. A distance of 4 centimeters along the line of current flow (2 centimeters or either side of the center line) is measured and the end points marked. The probes from the electrometer are placed on the end points of the measured 4 centimeter length and the potential difference measured. Generally, electrical resistivity is taken at 25° C. and the values reported in the Examples herein were measured at that temperature. The electrical resistivity value is calculated from the following expression:

Resistivity (ohm cm.) =
$$\frac{(\text{Potential Difference, volts})(\text{Cross Sectional Area, cm}^2.)}{(\text{Applied Amperage, Amps})(\text{Distance between voltage probes, cm.})}$$

Refractory metal boride powders prepared in accordance with the process described herein can be consolidated into shapes or forms of high density by conventional hot pressing, hot isostatic pressing or cold forming and sintering techniques. The refractory metal boride powders, e.g., titanium diboride, of the present invention can be consolidated by hot pressing by subjecting a mold containing the powders to a continuously applied pressure of from about 0.5 to 50 tons per square inch, e.g., 1 to 3 tons per square inch, while raising slowly its temperature to between 1600° C. and 2700° C., e.g., 1800° C.–2500° C. The compacting, heating and subsequent cooling operations are typically carried out in an inert atmosphere, e.g., argon or in a vacuum. The operation is often carried out in a graphite die having a cavity of the appropriate desired cross-sectional shape. The pressure is preferably applied to the powder by plungers acting on opposite ends of the powder, e.g., a column of powder. The nature of the hot pressing process is such as to render it difficult to form shapes other than flat plates and other relatively simple shapes. Moreover, hot pressing is a relatively expensive process and is hard to adapt to large scale production by continuous processing.

The refractory metal boride powders of the present invention can be consolidated by cold forming and sintering by pressing the powder into the desired shape followed by sintering the resulting form at temperatures between 1800° C. and 2500° C., e.g., 1950° C. and 2250° C., either in a vacuum or in a neutral (inert) atmosphere. For simple shapes such as cylinders, plates, or the like, the powders can be dry pressed in matched metal dies. For complicated shapes, slip casting, tape casting, pressure casting, compression casting, extrusion or injection molding can be used to cold form the article. Further, a wax binder can be incorporated into the powder by techniques such as spray drying, physical blending, etc. and the resulting powder blend molded into the desired shape in rubber molds. The powder composition can be mixed with a small portion of binder, e.g., 1 weight percent of paraffin wax dissolved in 1,1,1-trichloroethane solvent or by blending at above the melting point of the wax. The solvent is evaporated prior to consolidating the powder. The resulting powder composition-binder mixture can be consolidated by applying pressure to the mixture, e.g., isostatically or between matched metal dies, either at ambient temperature or at slightly elevated temperatures, but, significantly less than sintering temperatures. The pressure applied is in the range of 0.5 to 50 tons per square inch., e.g., 2–10 tons per square inch. Alternatively, the powder composition-binder mixture can be extruded into the desired shape. Sintering is accomplished by heating the consolidated shape in vacuum or inert atmosphere at temperatures of from 1800° C. to 2500° C., more typically from 1950° C. to 2250° C. Prior to sintering, it may be necessary to first heat the green compacts at temperatures sufficient to remove any organic binder material (if used). Heating at about 200° to 400° C. for about one hour in a vacuum or inert atmosphere is usually sufficient to remove such binder materials. The term "cold formed" as used herein means that the metal boride powder composition is compacted and shaped, as by pressing or molding, prior to the sintering operation, as distinguished from hot formed or hot pressed bodies which are shaped and pressed by the application of pressure during sintering.

It has been found that carbon-containing refractory metal boride, e.g., titanium diboride, powder compositions of the present invention can be cold pressed and sintered to high densities, i.e., at least 90 percent of the theoretical density of the refractory metal boride. Depending upon the particular powder composition, densities in excess of 93 percent of theoretical, e.g., in excess of 95 percent and often in excess of 98 or 99 percent of theoretical, can be achieved. Stated another way, cold pressed and sintered elements fabricated from titanium diboride powder compositions having a porosity level of not more than 10 percent, often less than 2 or 1 percent, now can be obtained. The aforesaid refractory metal boride powders and powder compositions also can be hot pressed to densities at least equal to that obtained by cold pressing and sintering and more usually to densities approaching the theoretical density. Since the technique of hot pressing limits to a great extent the shape and size of fabricated shapes, the availability of cold pressing and sintering as a consolidation technique provides engineering design opportunities which were not possible earlier.

The porosity present in the aforesaid articles of high density is essentially uniformly distributed throughout the article and is substantially submicron in size at sintering temperature up to about 2100° C. There is a low level population of sporadic flaws or larger defects that are commonly found in consolidated articles. When determined and classified in accordance with ASTM (American Society For Testing and Material) Method B 276-54 for cemented carbides, the apparent porosity of the aforesaid titanium diboride articles of high density is typically of Type A-1 or A-2, i.e., apparent porosity sizes under 10 microns in diameter, with some Type B-1, i.e., apparent porosity size of from 10 to 40 microns in diameter. The term "apparent porosity" is construed to mean (in that ASTM method) all microstructures observed in a photomicrograph of a properly prepared unetched surface, including structures resulting from uncombined carbon, non-metallic inclusions, etc., as well as true, inherent porosity. At sintering temperatures above about 2100° C., e.g., 2200° C., the apparent porosity appears to be essentially uniformly distributed and of the A-2 type with some B-3 type porosity. The latter type porosity (B-3) may be in part due to plucking of grains during preparation of the specimen surface. The porosity (especially the submicron porosity) present in the aforesaid articles of high density can be characterized further as substantially intragranular and as a closed or discontinuous porosity.

The porosity of titanium diboride articles prepared from purchased titanium diboride powder, which is believed to be prepared by the carbothermic process, is generally not uniformly distributed and is typically larger than the submicron porosity manifest by titanium diboride articles of the present invention. That porosity can be characterized further as substantially intergranular and is an open or interconnecting porosity. Such porosity is interstitial, i.e., it occurs between the grains. Consequently, the pores tend to be connected with one another by the grain boundaries.

The apparent grain size, i.e., the average diameter of the refractory metal boride grain as measured on an etched metallographically polished surface of a refractory metal boride specimen sintered up to about 2150° C. and containing from about 0.5 to about 1 weight percent total carbon is predominantly fine. As measured on photomicrographs of the polished surface, the predominant grain size of the boride grains of such specimens is generally less than 20 microns, i.e., in the range of about 1 to 20. When sintering temperatures are about 2000° C., the predominant grain size is in the range of from about 1 to 10 microns.

The apparent grain size varies directly with the sintering temperature and inversely with the level of total carbon. As sintering temperatures up to about 2050° C., and total carbon levels of between about 0.5 and about 1 weight percent, e.g., 0.7 weight percent, the maximum and predominant grain size range from about 1 to about 20 microns. At a sintering temperature of about 2100° C., the maximum grain size is in the range of 25 to 30 microns with a predominant grain size of from about 1 to 20 microns. At a sintering temperature of 2200° C., the maximum grain size is in the range of 40–50 microns with a predominant grain size of from about 5 to 35 microns. At total carbon levels of less than 0.5 weight percent, e.g., 0.3 weight percent, the apparent grain size of the microstructure is slightly larger. For example, at a sintering temperature of 2100° C., the maximum grain size is 45 to 50 microns with a predominant grain size of from about 5 to about 35 microns. At a sintering temperature of about 2200° C., the maximum grain size is about 80 to 85 microns with a predominant grain size of from about 20 to 60 microns.

The apparent grain size is generally reported as a maximum and predominant range. The maximum range describes the range which includes the smallest and the largest grains, and includes grains of low concentration; while the predominant range includes those grains that are present only in high concentrations, i.e., the predominant grains. See, for example, ASTM Method B 390-64, which is a description of practice for evaluating the apparent grain size and distribution of cemented tungsten carbide. As used in this description of porosity and grain size, the term "sintered" or "sintering temperature" is meant to refer also to temperatures used in hot pressing.

The grains of the refractory metal boride specimens of the present invention are of relatively uniform size and occur in a microstructure characterized by contiguous grain boundaries and low porosity resulting in high density and strength of the sintered bodies. The substantial uniformity of the grains results in a sintered article having a microstructure that is essentially homogeneous, i.e., a substantially uniform fine microstructure, in contrast with microstructures characterized by fine, medium and coarse grains distributed throughout the microstructure resulting in a non-uniform or non-homogeneous microstructure.

The shape of the grains of the articles of high density prepared from the metal boride, e.g., titanium diboride, powder described herein are essentially equant. Consequently, the internal structure of the articles shows a mosaic of substantially equidimensional grains with contiguous grain boundaries. It has been observed that such structures are characterized by the substantial absence of linear laminated regions, i.e., lineation or layered structures. Moreover, such structures can be contrasted with one in which elongate lath-shaped grains are predominant, a condition which has been observed when titanium diboride articles are prepared with some carbothermically produced titanium diboride powder compositions.

Titanium diboride articles of the present invention prepared by sintering (or hot pressing) the above described titanium diboride powder compositions at between about 2150° C., and about 2250° C. e.g., about 2200° C., have been observed to have improved resistance to thermal shock than articles prepared at lower sintering temperatures. Along with the increased grain size evidenced by the microstructure at such sintering temperatures, the microstructure appears to include discernible microcracks along the grain boundaries, i.e., a mosaic of interconnected microcracks develops. These microcracks are predominantly along the grain boundaries, are estimated to be about the length of the grains and are largely submicron in width. These microcracks are discernible on a polished unetched surface of the article at 1500X magnification.

Examination of the microstructure of titanium diboride articles of the present invention containing from above 0.1 to about 2, e.g., 0.15 or 0.3 to 1, weight percent total carbon and prepared from titanium diboride powder compositions in which the carbon-containing additive is coformed with the titanium diboride, reveals essentially a single phase. Additional phases, e.g., a metal carbide phase, are not discernible.

Hot pressed or cold pressed and sintered articles having densities of greater than 90 percent of theoretical of the refractory metal boride density, e.g., at least 92 or 93 percent of theoretical, have been generally considered in the art to be impermeable. The density of articles of the present invention commonly exceed 98 percent of the theoretical density for titanium diboride. When such articles, e.g., articles of 99+ density, are used in, for example, aluminum reduction or refining electrolytic cells, they are substantially impermeable to the molten material, e.g., molten aluminum or cryolite electrolyte, to which they are exposed in such cells. The refractory metal boride powder compositions of the present invention can be fabricated into articles having such densities and, accordingly, such articles are useful as current conducting elements in the aforementioned type electrolytic cells.

By substantially impermeable is meant that when such articles are used cathodically in an aluminum reduction cell and exposed to molten aluminum, the degree of penetration of aluminum through the surface of the article is slight, i.e., is less than about 1, e.g., less than about 0.5, millimeters after one month's exposure. It has been observed by scanning electron micrograph examination of a post exposure fractured specimen that highly dense, uncracked articles of the present invention are penetrated by aluminum to a distance of less than 0.2 millimeters after the month's exposure as a cathode in an aluminum reduction cell and with no observable penetration of cryolite.

Refractory metal boride compositions comprising mixtures of more than one metal boride powder and carbon-containing additive(s) are also contemplated herein. Thus, it is contemplated that blends of titanium diboride powder with zirconium diboride powder and/or hafnium diboride powder in most any proportion can be cold pressed and sintered, or hot pressed in the same manner as heretofore described. Such mixtures of boride powders can be prepared by blending the preformed boride powders in the relative amounts desired; or, the boride powders can be co-produced by introducing into the reactor, usually simultaneously, the refractory metal halides of the metal borides desired and in the proportion desired in the end product. Further, carbon-containing additive can be blended physically with the powder or simultaneously prepared with the aforementioned refractory metal borides in the amounts described previously by introducing a carbon source into the reaction zone of the reactor.

Generally, any volatile inorganic titanium, zirconium or hafnium halide, e.g., a compound of only the aforementioned metal and halogen (chlorine, bromine, fluorine and iodine), can be used as the source of the aforementioned metal in the refractory metal boride powder product prepared by the process described herein. As used herein the terms "metal halide" and "metal boride" or "metal diboride" are intended to mean and include the halides and borides respectively of titanium, zirconium and hafnium, i.e., the elements of Group 4b of the aforesaid Periodic Table of the Elements. However, for the sake of convenience and brevity, reference will be made sometimes to only one of the aforementioned metal halides or borides.

Exemplary of the refractory metal halides that can be employed in the present process include: titanium tetrachloride, titanium tetrabromide, titanium tetraiodide, titanium tetrafluoride, zirconium tetrabromide, zirconium tetrachloride, zirconium tetrafluoride, zirconium tetraiodide, hafnium tetrabromide, hafnium tetrachloride, hafnium tetrafluoride, hafnium tetraiodide, as well as subhalides of titanium and zirconium such as titanium dichloride, titanium trichloride, titanium trifluoride, zirconium dibromide, zirconium tribromide, zirconium dichloride and zirconium trichloride. Of course, subhalides other than the subchlorides and subfluorides can be used in the same manner. Further, inorganic metal halide corresponding to the refractory metal carbide(s) desired coproduced with the metal boride, if different than the metal boride powder being produced, can be used. For example, the halides of hafnium, tantalum, silicon and other refractory metals, the carbides of which are desired can be used. Mixtures of metal halides of the same metal such as the chlorides and the bromides, e.g., titanium tetrachloride and titanium tetrabromide can be employed as the metal halide reactant. Further, mixtures of halides of different metals can be used when it is desired to co-produce more than one metal boride powder, e.g., titanium diboride and zirconium diboride, or more than one metal carbide. Preferably, the halogen portion of the metal halide reactant(s) is the same to avoid separation and recovery of different hydrogen halides from the product stream. The metal halide reactant(s) can be introduced into the reactant inlet assembly (mixer means) used to introduce the reactants into the reactor as a liquid or vapor; but, should be introduced in such a manner that the reactant(s) is a vapor in the reactant mixing zone and subsequent reaction zone. Economically preferred as the metal halide reactant are the tetrachlorides, e.g., titanium tetrachloride. The metal halide reactant(s) should be substantially pure, i.e. substantially free of metal contaminants and free or chemically combined oxygen so as to produce a metal boride powder having the purity described earlier.

The boron source reactant like the metal halide reactant should be also oxygen-free and substantially pure to avoid the introduction of oxygen and metal contaminants into the metal diboride product. By oxygen-free is meant that the boron source is substantially free of chemically combined oxygen, e.g., the oxides of boron, as well as uncombined oxygen. Despite the precautions of reactant purity, a small amount of oxygen contamination occurs in the boride powder, as earlier described. As a suitable source of boron for the metal borides, there can be mentioned inorganic boron compounds such as boron tribomide, boron triiodide, boron trichloride, boron trifluoride and the hydroborides (boranes), e.g., $B_2H_6$, $B_5H_9$, $B_{10}H_{14}$, and $B_6H_2$, boron trichloride is preferred. As in the case of the metal halide reactant, the boron source reactant is introduced into the reactor in such a manner that it is present in the reactant mixing zone and reaction zone as a vapor. The metal halide source and boron source should be chosen from those compounds which, in combination, provide a thermodynamically favorable reaction at the desired reaction temperature. For example, the reaction of titanium tetrachloride with boron trifluoride is thermodynamically less favorable at 2000° K. than at 2500° K. Thus, such thermodynamically less favorable reactions will require higher reaction temperatures.

The amount of boron source reactant introduced into the reaction zone in the reactor will be preferably in at least stoichiometric quantities, i.e., in amounts sufficient to provide at least two atoms of boron for each atom of metal, e.g., titanium, introduced into the reaction zone in the reactor as metal halide, e.g., titanium halide, reactant. The ratio of the boron source reactant to the metal halide reactant can, of course, vary from stoichiometric quantities. Thus, the boron source reactant can be introduced in amounts sufficient to provide in the reaction zone between about 1.8 and about 3 atoms of boron per atom of metal, e.g., titanium. Preferably, greater than the stoichiometric ratio is used. For example, the mole ratio of reactants boron trihalide to titanium tetrahalide ($BX_3/TiX_4$), where X is halogen, can vary from about 1.8:1 to 3:1 and preferably is about 2. When a stoichiometric excess of the boron source is used, less residual unreacted metal halide reactant is found in the product. When a stoichiometric excess of metal halide is used, sub-halides of the metal are found in the product. While it is preferred that the boron source reactant be used in stoichiometric excess either of the metal halide or boron source reactants can be used in stoichiometric excess in amounts of from 5 to 30 percent by weight.

The carbon source reactant should also be of the type that is readily volatile in the reaction zone and is capable of reacting in a thermodynamically favorable manner at the temperatures at which the reaction is conducted. In the aforesaid embodiment, volatile hydrocarbons, halogenated hydrocarbons or mixtures thereof that are substantially pure and oxygen-free, as defined above, can be used as the carbon source. As used herein, the term "halogenated hydrocarbon", e.g., "chlorinated hydrocarbon", is intended to mean and include both compounds of carbon, halogen and hydrogen, and compounds only of carbon and halogen, e.g., carbon tetrachloride.

Typical hydrocarbons that can be used as the carbon source include the normally gaseous or liquid but relatively volatile hydrocarbons including saturated and unsaturated $C_1$—$C_{12}$ hydrocarbons, such as methane, ethane, propane, the butanes, the pentanes, decanes, dodecanes, ethylene, propylene, the butylenes and amylenes, symmetrical dimethylethylene and like alkenes, cycloaliphatic and aromatic hydrocarbons, such as cyclopentane, cyclohexane, toluene, benzene, etc., and acetylenic compounds of which may be noted acetylene, methyl acetylene, ethyl acetylene, and dimethyl acetylene. Methane or propane are economically preferred for this purpose. Rarely are hydrocarbons of more than twelve carbons used.

Examples of halogenated hydrocarbons that can be used as the source of carbon in the process described herein include saturated and unsaturated compounds containing from one to twelve, more usually one to eight, carbon atoms, such as methyl chloride, ethyl chloride, chloroform, methylene chloride, carbon tetrachloride, dichlorodifluoromethane, amyl chloride, chloroethane, vinyl chloride, 1,1-dichloroethylene, 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane, and like aliphatic chlorides, fluorides, bromides or iodides containing up to about twelve carbon atoms, most preferably up to about six carbon atoms. Aromatic halocarbon compounds, e.g., chlorocarbon compounds, also can be used. Such compounds include $C_6$-$C_9$ halogenated aromatic compounds, such as monochlorobenzene, orthodichlorobenzene, paradichlorobenzene and the like. Cycloaliphatic halides, such as the $C_5$-$C_6$ aliphatic halides, e.g., chlorinated cyclopentane and cyclohexane, etc., can also be used.

Typically, the above-described hydrocarbons and halogenated hydrocarbons should be readily vaporizable (volatile) without tar formation since otherwise unnecessary difficulties which are unrelated to the process itself can arise, such as the plugging of transfer lines by decomposition or polymerization products produced in the course of vaporizing the carbon source reactant. The $C_1$-$C_3$ hydrocarbons and halogenated hydrocarbons have been found very useful.

The amount of carbon source reactant, e.g., hydrocarbon or halogenated hydrocarbon, used will of course depend on the amount of carbon desired in the final boride powder product. The amount of total carbon in the metal diboride powder, e.g., titanium diboride powder, or diboride powder composition can range from above 0.1 to about 5 weight percent, preferably from above 0.1, e.g., 0.15 or 0.3, to about 1 or 2, weight percent. Total carbon levels of from about 0.5 to 1 weight percent, e.g., 0.7 weight percent have been found to be desirable. The use of about 1 weight percent total carbon has been observed to be very useful.

When a carbon source reactant is introduced into the reactor, it is expected that carbide(s) of metal(s) present in the reactor, e.g., titanium carbide are co-produced in situ with metal diboride. At low levels of carbon, i.e., less than 1 weight percent total carbon, the X-ray pattern characteristic of metal carbides, such as titanium carbide, in the diboride powder is not fairly evident. By "total carbon" is meant the total amount of both free carbon and chemically combined carbon, e.g., metal carbide, in the metal diboride powder product. If, for example, all of the co-formed carbon in titanium boride powder is present as titanium carbide, a total carbon content of between above 0.1 and about 5 weight percent corresponds to a titanium carbide content of between above 0.5 and about 25 weight percent. On the same basis, a total carbon content of 0.15 to 2, e.g., 1 weight percent, corresponds to a titanium carbide content of between about 0.75 and 10, e.g., 5 weight percent.

The vapor phase reaction of metal halide and boron source reactants with or without a volatile carbon source is conducted in the presence of hydrogen. The amount of hydrogen utilized in the above-described process is at least that amount which is required stoichiometrically to satisfy the theoretical demand of the reaction. Preferably, the amount of hydrogen used is in excess of the theoretical amount. When, for example, the metal halide reactant used is titanium tetrachloride and the boron source reactant used is boron trichloride, the theoretical amount or demand of hydrogen required can be expressed by the equation:

$$TiCl_4 + 2BCl_3 + 5H_2 \rightarrow TiB_2 + 10\ HCl \qquad 1.$$

Often the amount of hydrogen utilized will be in excess of ten times and as high as 100 times the amount of hydrogen shown to be required by the above equation or required to equal the chemical equivalents of halogen of the metal halide and/or boron halide, and halogenated hydrocarbon (if used) reactants. When the boride source is a hydroboride, the hydrogen available from the hydroboride can be used to satisfy all or a part of the hydrogen demand. Typically, the mole ratio of hydrogen to metal halide reactant ranges between about 20 and 40, e.g., 25 moles of hydrogen per mole of metal halide.

The temperature at which the vapor phase reaction of metal halide and boron source reactants is conducted will depend on the reactants selected and will be those temperatures at which submicron metal boride powder is produced with the selected reactants under thermodynamically favorable conditions, i.e., metal boride powder forming temperatures. The average reaction zone temperature for the aforementioned vapor phase production of metal boride powder such as titanium diboride powder typically is above 1000° C. and usually ranges upwardly of 1000° C. to about 3500° C. The process can be conducted at subatmospheric, atmospheric, and superatmospheric pressures. Typically, the process is conducted at between about 1 and about 3 atmospheres, normally between 1 and 1.5 atmospheres pressure.

The process and handling equipment utilized in the aforementioned process for producing metal diboride powder (as more specifically described hereinafter) are constructed from materials resistant to the temperatures and corrosive environment to which they are exposed during the various steps of the procedure, as outlined hereinafter. The present invention will be more fully understood by reference to the accompanying drawings. Referring now to FIG. 1, there is shown apparatus comprising plasma generator heating means 1 mounted atop reactant inlet assembly (mixer) means 30 which, in turn, is mounted atop reactor 34. Although the aforesaid apparatus is shown in vertical alignment, other alignments away from the vertical including a horizontal alignment are contemplated. While the plasma generator heating means shown is an arc heater, other plasma heater types, e.g., an induction (high frequency) heater, can also be used. Further, other heating means such as electrical resistance heaters, can be used to heat hydrogen to the temperatures required by the process described herein. The hydrogen is heated typically to temperatures which is sufficient to establish and maintain metal boride forming temperatures in the reaction zone bearing in mind that it is mixed with the metal halide and boron source reactants which are introduced into the reaction zone at below the reaction temperature, usually significantly below reaction temperatures. Thus, the principal source of heat for the reaction is generally the highly heated hydrogen gas stream. Plasma heater 1 consists essentially of an annular anode 11 which is aligned coaxially with cathode rod 3. Both anode and cathode are mounted in a cylindrical sleeve 9 which is electrically non-conductive. In the embodiment illustrated, the cathode rod tapers conically at its end essentially to a point. The anode and cathode are constructed out of conventional electrode type materials, such as copper, tungsten, etc. The cathode often has a thoriated tungsten tip or inserts which assist in cooling of the cathode.

As is conventional with plasma heaters, the anode is surrounded by an annular cooling chamber 13 through which coolant e.g., water, or other cooling medium is circulated by means (not shown) in order to hold the anode at a suitably low temperature and prevent undue erosion thereof. In a similar manner, the interior of the cathode is provided with cooling chamber 7 and with means (not shown) to circulate water or other suitable cooling fluid therein in order to hold the cathode at a suitable operating temperature. Tube 2 serves to help support and align cathode rod 3 and provide a conduit for coolant flow. Cathode 3 can be provided with means for moving it in a vertical direction so that the distance between cathode 3 and anode 11 can be varied.

The anode and cathode are axially aligned but spaced longitudinally to provide annular space 21 which tapers conically to a coaxial outlet conduct 23. The assemblage is also provided with plasma or work gas inlet means 15 having conduit 17 which communicates through annular conical conduit 19 with the annular space 21. The cathode and anode are connected by electrical connecting means (not shown) to a power supply (not shown). Typically, the power source is a direct current power source.

Reactant mixer means 30 is adjacent to the anode end of cylindrical sleeve 9, and as shown, comprises two coaxial, longitudinally spaced annular conduits 42 and 47 that are provided with inlet nozzle means 40 and 45, respectively. As shown, exit port 48 of annular conduit 47 is retracted from exit port 43 of annular conduit 42 to form a conical reactant introduction zone 24. Reactants from reactant supply means (not shown) are introduced into conduits 42 and 47 through nozzle means 40 and 45 respectively. The flow path of the reactants discharged through exit ports 43 and 48 can be perpendicular to the exiting gas from conduit 23, as shown. If desired, exit ports 43 and 48 also can be positioned away from the perpendicular, i.e., downwardly or upwardly, at an angle of from 1° to 45° from the horizontal position shown so that the reactant gas flow is directed at such angle into or in contact with the stream of hot gas emanating from the plasma heater. The reactang gas can be projected radially, tangentially or at any suitable angle therebetween into the downwardly flowing stream of heated plasma gas emanating from outlet conduit 23. The top of reactant mixer means 30 contains opening 31 which is coaxially aligned with outlet conduit 23 of anode 11 to provide an overall direct straight-line path for the heated plasma gas from plasma generator 1 through reactant mixer means 30 into reactor 34. Preferably, the heated plasma gas is introduced into the center of reactor 34 and spaced from the walls thereof to thereby assist in positioning the reaction zone away from the walls of the reactor.

Typically, hydrogen is used as the gas which is heated by the aforementioned heating means, e.g., plasma heater 1; however, other gases, e.g., the noble gases can be used. Argon and helium are suitable plasma gases. The use of hydrogen as the plasma gas is advantageous since it insures the establishment of a reducing atmosphere and provides a halogen, e.g., chlorine, acceptor, thereby removing halogen released from the metal halide, boron halide and/or halocarbon compound reactants as hydrogen halide. Mixtures of hydrogen with other gases, such as the noble gases, e.g., argon or helium, can also be employed as the plasma gas. When a noble gas is used as the plasma gas, the hydrogen required for the vapor phase reaction is introduced into the reactor by mixing it with the reactants, as a part of the boron source reactant, e.g., the boranes, and/or as a separate stream through mixer means 30.

As the heated plasma gas stream moves past the zone of reactant introduction 24, it mixes with the reactants introduced through reactant mixer means 30. The reactants are introduced usually at below reaction temperatures. Because of the high heat content of the hot hydrogen stream no special efforts to heat the reactants to temperatures above which they are gaseous are required. The resulting gaseous mixture is forwarded into the interior of reactor 34 and reacted therein. Reactor 34 is typically externally water cooled (not shown). Typically, the reactants and reaction mixture are in turbulent flow although laminar flow can be used. The reaction mixture flowing into reactor 34 which is a recirculating-type reactor as opposed to a plug flow-type reactor, typically has an apparent residence time therein of between about 0.05 and about 0.5 seconds, more usually between about 0.1 and 0.2 seconds. The apparent residence time can be calculated by dividing the reactor volume by the gas flow through the reactor.

As shown in FIG. 1, finely-divided metal diboride powder product, which is suspended in reaction product gases as well as excess reactant gas, hereinafter collectively referred to as product gases or other equivalent terms, is removed from reactor 34 through conduit 36 and introduced into cyclones 38 and 39, in order to separate the solid metal diboride powder from the product gases. The submicron particles of metal diboride are formed completely in the reactor and since the reactor effluent is cooled to below metal boride forming temperatures substantially immediately, substantially no metal boride formation or individual particle growth (other than by physical aggregation) occurs outside the reactor. Cyclones 38 and 39 are normally cooled, e.g., externally water cooled to cool the powder product. For example the cyclones can be traced with tubing through which coolant, e.g., water, is passed. As shown, the discharge from conduit 36 is introduced tangentially into cyclone 38 and from there into cyclone 39 by means of conduit 51. Titanium diboride powder drops out into receivers 25 and 26, respectively, while gaseous effluent leaves cyclone 39 through conduit 52 and into solids separation chamber 28 in which there is disposed a bag filter 29, electrostatic precipitator or other convenient means for separating suspended solids from a gas. Cyclones 38 and 39, and receivers 25 and 26 are closed to the atmosphere to prevent contamination of the product with oxygen. Thus, the metal diboride powder that is formed in the reactor at metal diboride forming temperatures is removed immediately from the reactor and forwarded to product collectors that are substantially below temperatures found in the reactor. The powder product is typically cooled or allowed to cool to room temperature. However, if the cooling capacity of the cyclones and receivers is not sufficient to provide a powder product at room temperature, the product in the receivers may be above room temperature, i.e., from about 20° C. to 100° C., because of the residual heat content of the powder. Higher temperatures in the receiver may be used intentionally, as described hereinafter, to promote degasification of the powder product. Separation chamber 28 as shown also has an exit or exhaust 50 on the opposite side of the bag filter. As shown, the bag filter has engaged therewith a suitable shaking means 59 to clear the filter of metal diboride powder. While only two cyclones and receivers are shown, more than two can be used. Alternatively a single receiver and cyclone can be used. Further a porous metal filter, as described in U.S. Pat. No. 4,080,431, can be used to collect the product.

Solids separation chamber 28 can also be a caustic water scrubber, often containing packing of some sort, e.g., balls, saddles, etc. for greater contact. The scrubber separates the fine solids from the gas stream and neutralizes acidic species therein before the gas is discharged to the atmosphere or to a flue. To recover unreacted reactants, hydrogen, hydrogen chloride, etc. from the product gases substantially devoid of its solids burden, conventional separation and recovery means for such materials can be installed between exit conduit 52 and the flue. Further, if the heat removal from the product recovery apparatus, i.e., the cyclones and receivers, is insufficient, the product transfer line 36 can be externally cooled. Moreover, a cold or cooler compatible gas can be mixed with the exiting product effluent to thereby cool it.

Figure 2:
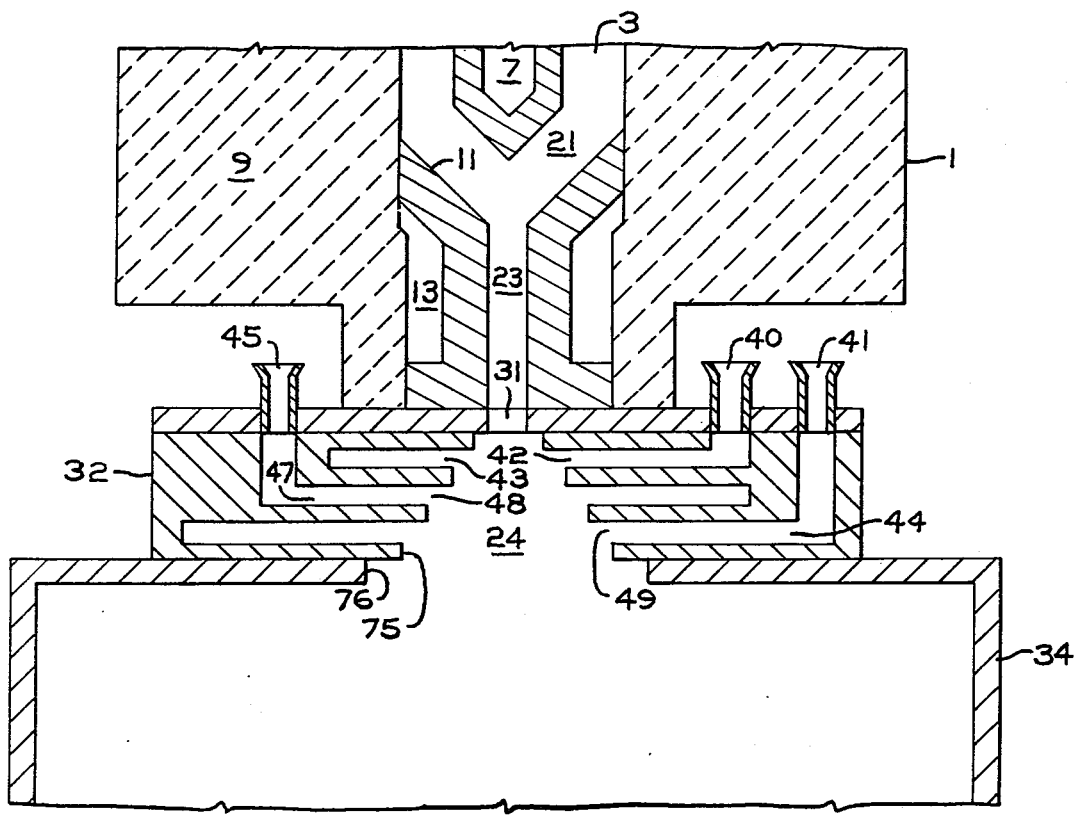
FIG. 2 is a diagrammatic sectional view of the lower portion of the arc plasma gas heating means and upper portion of the reactor of FIG. 1 combined with three slot reactant mixer means in place of the two slot reactant mixer means illustrated in FIG. 1.

Referring now to FIG. 2, there is shown a partial assembly, in cross-section, similar to that of FIG. 1, except that three-slot reactant mixer means 32 instead of two-slot reactant mixer means 30 is shown. In addition to annular conduits 42 and 47, there is shown a coaxial, annular conduit 44 which is spaced longitudinally from annular conduits 42 and 47. The exit port 49 of conduit 44 is retracted from that of conduit 47 to further extend conical reactant introduction zone 24. Annular conduit 44 is connected to nozzle means 41 for introducing reactant gas into said conduit. Nozzle means 41, is in turn, connected with reactant gas supply means (not shown). Reactant mixer means 30 and 32 can be constructed of any suitable material, such as graphite, molybdenum, refractory or any other material which will withstand the heat and corrosive environment present in the reactant introduction zone 24. The mixer means can be internally cooled thereby permitting the use of conventional metal fabrication.

When a source of carbon is introduced into the reactor to prepare a carbon-containing metal diboride powder (presumably as simultaneously produced metal carbide), the carbon source reactant can be introduced by any convenient means. Thus, the carbon source reactant can be introduced into the reactor mixed with one or both of the metal halide and boron source reactants. Alternatively, the carbon source can be introduced as a separate reactant stream. Thus, apparatus such as described and shown in FIG. 2, provides individual conduits for each of the reactants when the aforesaid embodiment is used. The reactants can be introduced into the reactor in any sequence; however, the metal halide, e.g., titanium halide, reactant is introduced preferably upstream of the boron source reactant. Preferably the carbon source reactant is introduced prior to the metal halide and boron source reactants. Further, one or more of the reactant gases can be introduced through the same conduit in the reactant mixer means (provided the reactants are at a temperature at which inter-reaction does not occur) thereby leaving a conduit for the use of a sheath gas. Still further, mixer means with four, five or more slots are contemplated so that each reactant and gas stream introduced through said mixer means can be introduced separately.

When it is desired to produce metal boride, e.g., titanium diboride, powder in the absence of co-formed metal carbide, metal halide, e.g., titanium tetrachloride, reactant can be introduced through the top slot of the three-slot mixer means depicted in FIG. 2, hydrogen is introduced through the middle slot thereby acting as a sheath gas between the metal halide reactant and the boron source reactant, e.g., boron trichloride, which is introduced through the bottom slot of the mixer. Alternatively, metal halide can be introduced through the top slot, boron source reactant through the middle slot and sheath gas, e.g., hydrogen, through the bottom slot. The sheath gas serves to prevent contact of the reactant gases with exposed surfaces of the mixer means 32, such as lip 75, and the reactor, e.g., the upper lip 76 of reactor 34. When metal boride, e.g., titanium diboride, is to be produced with co-formed metal carbide, e.g., titanium carbide, the carbon source reactant can be introduced through the top slot, the metal halide reactant introduced through the middle slot and the boron source reactant introduced through the bottom slot. Other reactant introduction sequence can, of course, be used if desired.

The metal halide, carbon source and boron source reactants are mixed commonly with a carrier gas to facilitate their introduction into reactant introduction zone 24. The carrier gas can be hydrogen, recycle hydrogen, recycle solids-free product gas, or a chemically inert, (i.e., inert with respect to the reactant with which it is admixed) gas such as the noble gases, e.g., argon and helium. Hydrogen is not used commonly with the boron source reactant, e.g., boron trichloride, for the reason that hydrogen has been observed to react with the boron halide reactant within the reactant inlet conduits thereby causing blockage thereof. The amount of carrier gas used to facilitate the introduction of the reactants can vary; but, generally will range between 250 and 1200 mole percent based on the reactant with which the carrier gas is admixed. The carrier gas assists in cooling the mixer means, in keeping reactant conduits free of condensibles and has some effect in controlling the mixing of the reactants in zone 24 with a consequent effect on the surface area of the metal boride powder product.

The mean particle size (and thus surface area) of the refractory metal boride particles comprising the powdery product prepared by the process described herein is a function of many variables within the process system some of which can be interrelated. From the evidence at hand some general observations can be made. Particle size tends to increase with an increase in the rate of production. Particle size does not appear to change significantly with changes in the hydrogen plasma gas flow. Particle size tends to decrease with an increase in the intensity of mixing resulting from the use of larger amounts of carrier gas (or inert gas) introduced into the reactor other than by means of the plasma gas. Finally, increasing the amount of nuclei from additives, such as hydrocarbons, tends to decrease the particle size.

In carrying out the preparation of refractory metal diboride powder by the process and with the apparatus described herein, and particularly with reference to FIG. 1 adapted with reactant mixer means 32 of FIG. 2, a hydrogen-containing gas or noble gas, e.g., argon, is introduced into plasma generator means 1, through conduit 17 from whence it is directed by means of annular conduit 19, into space 21, between cathode 3 and anode 11. The plasma gas can be introduced in a manner such that the gas flows in a spiral or helical fashion through outlet conduit 23. Alternatively, the plasma gas can be introduced radially into the space 21 between the cathode and anode so that there is no helical flow pattern established by the plasma gas and the heated plasma gas exits the plasma heater in a substantially linear flow path. When the hot plasma gas moves in a helical pattern, plasma gas collimating means, such as described in U.S. Pat. No. 4,022,872 can be used.

An electric arc is established between the anode and cathode and as the arc passes through the plasma gas, the gas is heated to high temperatures, usually temperatures above reaction zone temperatures. A hydrogen-containing plasma gas can have an enthalpy of between 20,000 and 60,000 BTU per pound of gas, more commonly between 30,000 and 40,000 BTU/pound. The heated plasma gas is projected directly into reactor 34, passed reactant introduction zone 24 formed by the lower lip of anode 11 and the exit ports of reactant inlet conduits 42, 47 and 44.

Reactant gases, metal halide and boron source reactant, are introduced, in one embodiment, into nozzles 40 and 41, respectively, and thence into reactant introduction zone 24 and into the environment of the downwardly flowing stream of hot plasma gas. The reactant gases can be introduced at a mass velocity such that they are aspirated by the movement of the projected plasma stream or, they can be introduced into the plasma stream at a mass velocity such that the plasma stream is momentarily constricted. Hydrogen can be introduced into nozzle 45 of reactant mixer 32 and thence into the reactant introduction zone 24 thereby acting as a gas sheath between the metal halide and boron source reactants.

The formation of refractory metal diboride powder by the gas phase reaction of the corresponding metal halide and boron source reactants in the presence of hydrogen and in the substantial absence of oxygen (combined or elemental) commences essentially immediately with the mixing of the reactants in the reaction zone at metal boride forming temperatures. Optimally, the gas phase reaction is confined to a zone within reactor 34 away from the hot surfaces of the reactant mixer means and the reactor. This minimizes deposition of the metal boride powder product on the wall surfaces, which, if not otherwise removed, will continue to build-up until causing interruption of the process. The powder that builds-up on the walls of the reactor tends to be coarser than the powdery product removed from the reactor soon after it is formed. Co-mingling the build-up powder on the wall with the principal diboride powder product contributes to the production of a non-uniform product. When the principal powder product becomes non-uniform because of coarse powder from the reactor wall the powder product should be classified to remove oversized particles before being used. To avoid product growth on the reactant mixer means, anydrous hydrogen halide can be introduced with the reactants in the manner described in U.S. Pat. No. 3,979,500.

Finely-divided refractory metal diboride powder suspended in reactor effluent product gas is removed immediately from reactor 34 and introduced into cyclone 38. A portion of the powder product is removed in cyclone 38 and recovered in receiver 25. Powder product retained in the gas effluent from cyclone 38 is forwarded via conduit 51 to cyclone 39 wherein further amounts of metal diboride powder product are removed and recovered in receiver 26. Additional cyclones and receivers can be used if needed. In most cases, the products from receivers 25 and 26 are blended into a single product.

The reactor effluent product gas, now substantially free of its solid metal diboride powder content, is forwarded to gas separation chamber 28 where it is treated to free it from any remaining suspended metal diboride powder. As shown, the product gas passes through a bag filter 29 and is removed from chamber 28 by means of conduit 50. The product gas now removed of its metal diboride and/or other solids burden can be treated further to recover valuable by-products and remove noxious components therefrom before being burned or discharged to the atmosphere. If desired, the product gas can be treated to recover hydrogen and/or hydrogen halide, e.g., hydrogen chloride, for use in the present process or in some other process or the cooled product effluent stream can be recycled to the reactor as a source of cooling or diluent gas.

The metal diboride powder produced prepared in accordance with the aforementioned process is a finely-divided powder that can adsorb gases such unreacted reactants that may be present in the receiver in which the product is collected. To avoid contamination by adsorption, receivers 25 and 26 are heated generally to temperatures above about 200° F. (93° C.), e.g., from about 200° F.–600° F. (93° C.–316° C.) to assist in degassing of the product during collection of the product. Simultaneously, it is advantageous to maintain a stream of hydrogen or an inert noble gas, e.g., argon, percolating through the product to further assist in the degasification step while the product cools. If the product is not substantially free of unreacted reactants such as the metal halide, e.g., titanium halide, and boron source, e.g., boron halide, such compounds can react with moisture or oxygen in the atmosphere to form oxides or hydroxides of the metal, e.g., titanium or boron, thereby introducing oxygen contamination into the product. Advantageously, the product is handled without exposure to the atmosphere; however, in some cases, some exposure to the atmosphere cannot be prevented. In the event the metal diboride powder product contains adsorbed chlorine-containing species, e.g., the subhalides of the metal halide reactant such as titanium trichloride and titanium dichloride, such species can be removed by heating the product to between about 400° and 1000° C., e.g., 500°–700° C. and preferably about 600° C. for between about 1 and 4 hours. In performing such heating step, the metal diboride powder is charged to a calciner or similar furnace, preferably a rotating calciner, and heated to the indicated temperatures for the indicated time. A stream of hydrogen or inert gas, such as argon, is maintained over the heated product to help remove undesirable adsorbed gases from the product and prevent exposure to oxygen. After degassing, the boride product can be coated with a paraffin wax or other similar binder material to minimize the rate of oxygen pick-up during storage and handling.

The boride powder compositions having carbon-containing additive described herein, particularly titanium and zirconium diboride compositions, when hot pressed or cold pressed and sintered into solid shapes are especially useful as current conducting elements, e.g., electrodes, in electrolytic cells for the production of metals, e.g., aluminum. The term "electrolytic cell" as used herein with respect to aluminum production is intended to include both reduction cells and three-layer cells for the refining or purification of aluminum. When used as a current conducting element, titanium and zirconium diboride can comprise at least part of the cathode of the electrolytic cell or of the elements used for conducting electrolyzing current to and/or from the electrolytic cell, and can be exposed to the molten metal either in the reduction cell or in the purification cell.

Current conducting elements prepared with metal diboride powders of the present invention can be disposed in a vertical or inclined position in the electrolytic cell for the reason that molten aluminum wets the surface of such elements. Thus, a cathode prepared from the titanium diboride powder of the present invention can be arranged in the electrolytic cell so that the operative face or faces of the cathode are disposed at a relatively large angle, i.e., 60 or 90 degrees, to the horizontal, thereby allowing the deposited aluminum to continuously drain from the face or faces of the cathode and preferably to collect in a pool in contact with a lower part of the cathode from which pool it may be withdrawn from time to time in the usual manner. Due to the inclined or substantially vertical arrangement of the cathode, the floor space occupied by the electrolytic cell is very considerably reduced in relation to that which is conventionally required. Perhaps the largest advantage to the use of inclined or substantially vertically arranged electrodes of the instant metal diborides in that surging of the molten aluminum is less likely to occur so that the spacing of the anode and cathode can be substantially reduced compared with that adopted in aluminum reduction cells heretofore known and the dissipation of electrical energy in the electrolyte correspondingly reduced. Moreover, current conducting elements prepared from titanium diboride compositions have relatively high electrical conductivity, i.e., a low electrical resistivity, and therefore the voltage drop due to the passage of the operating current is less than that experienced in cells of orthodox construction. The effect of sludge formation at the bottom of the cell which causes an undesirable additional voltage drop at the cathode in existing horizontal cells can also be avoided. Thus, the use of current-conducting elements prepared from metal diboride powder of the present invention in aluminum reduction cells improves the passage of electrolyzing current through the cell because of the low electrical resistivity of the compositions, and further, when such elements are used in a substantially vertical or inclined position, the voltage drop across the electrolytic cell is significantly reduced thereby providing significant savings in power. Such power savings have become increasingly more important due to the continuing rising cost of power.

The use of titanium diboride current-conducting elements in electrolytic cells for the production of refining of aluminum is described in the following U.S. Pat. Nos. 2,915,442, 3,028,324, 3,215,615, 3,314,876, 3,330,756, 3,156,639, 3,274,093 and 3,400,061. Despite the rather extensive effort these patents indicate was mounted and the potential advantages for using titanium diboride and titanium diboride compositions as current-conducting elements in electrolytic cells for the production of aluminum as described in the aforementioned patents, such compositions do not appear to have been commercially adopted on any significant scale by the aluminum industry. The reasons for such lack of acceptance are believed to be related to the lack of stability of the current-conducting elements prepared from the titanium diboride powders of the prior art during service in electrolytic reduction cells. It has been reported that such current-conducting elements prepared with compositions of the prior art fail after relatively short periods in service. Such failure has been associated in the past with penetration of the current-conducting element structure by the electrolyte, e.g., cryolite, thereby causing critical weakening of the self-bonded structure with consequent cracking and failure. Other reasons proposed have been the solubility of the compositions in molten aluminum, molten flux or electrolyte, or the lack of mechanical strength and resistance to thermal shock.

Ideally, a current-conducting element should have the following characteristics:
1. Good electrical conductivity.
2. It must not react with nor be soluble in either molten aluminum or, under cathodic conditions, in molten flux or electrolyte, at least to any appreciable extent at the operating temperature of the cell. The solubility of the material in molten aluminum is an important consideration as it determines both the useful life of the current-conducting element and the degree of contamination of the aluminum produced through the agency of such current-conducting element.
3. Wetability by molten aluminum.
4. Capable of being produced and fabricated into required shapes economically.
5. High stability under the conditions existing at the cathode of the cell, i.e., it should possess good resistance to penetration by the molten electrolyte (cryolite) and to cracking.
6. Low thermal conductivity.

7. Good mechanical strength and resistance to thermal shock.

In order to have high stability under service conditions and resistance to penetration by the electrolyte, the current-conducting element prepared of titanium diboride powder compositions must have a relatively high density. In the past, high densities have been achieved with metal boride powder compositions of the prior art by hot pressing only. The metal boride powders of the present invention can be coldformed and sintered to high densities. These metal boride powders provide the opportunity for preparing current-conducting elements of simple and complex shapes at a reasonable cost. Such current-conducting elements are resistant to the environment existing in electrolytic cells for the reduction or purification of aluminum and have improved stability compared to prior art boride compositions in such electrolytic cells.

The present invention is more particularly described in the following examples which are intended as illustrative only since numerous modifications and variations therein will be apparent to those skilled in the art. In the following examples, some volumes of gas are expressed in cubic feet per hour at standard conditions [14.7 pounds per square inch (101.3 kPa) pressure and 70° F. (21° C.)] or SCFH. Reactant and other gas stream rates were measured at nominal laboratory conditions, i.e., 1 atmosphere and 70° C. (21° C.), and are reported as measured if other than SCFH. Unless otherwise specified all percentages are by weight.

The following examples illustrate the preparation of refractory metal borides with and without added carbon by vapor phase reaction of the corresponding metal halide and a boron source in the presence of a hot hydrogen stream and in the substantial absence of oxygen, combined or elemental.

EXAMPLE I

Apparatus analogous to FIG. 1 modified with the reactant inlet assembly means of FIG. 2 was used to prepare finely-divided titanium diboride. The power to the plasma heater was 22.5 kilowatts. Hydrogen in the amount of 300 SCFH was used as the plasma gas. 0.71 grams per minute of 1,1,2-trichloroethane together with 45 SCFH hydrogen as a carrier gas was introduced through the top slot of the three-slot reactant inlet assembly means, which was fabricated from graphite. Titanium tetrachloride in the amount of 18.8 grams per minute together with 20 SCFH hydrogen and 5 SCFH hydrogen chloride was introduced through the middle slot of the reactant inlet assembly means. Boron trichloride in the amount of 21.7 grams per minute, together with 22 SCFH argon was introduced through the bottom slot of the reactant inlet assembly means. This run was continued for 989 minutes and produced titanium diboride having a B.E.T. surface area of 24.0 square meters per gram. The product was analyzed for carbon and found to have 0.55 percent total carbon.

EXAMPLE II

The apparatus and general procedure of Example I was used except that titanium tetrachloride in the amount of 72.2 grams per minute and 15 SCFH of hydrogen were introduced into the reactor through the top slot of the reactant mixer assembly means. 1.26 grams per minute of 1,1,2-trichloroethane, 45 SCFH of hydrogen and 20 SCFH of hydrogen chloride were introduced through the middle slot and boron trichloride in an amount calculated to represent a 10 percent stoichiometric excess (basis the titanium tetrachloride) and 8 SCFH of argon were introduced through the bottom slot of the reactant mixer assembly. The titanium diboride powder product recovered had a B.E.T. surface area of 11.5 square meters per gram and was found to contain about 31.6 percent boron, 0.08 percent chlorine, 0.19 percent oxygen and 1 percent total carbon.

EXAMPLE III

Run A

Apparatus similar to FIG. 1 was used to prepare titanium diboride. The arc heater was a medium voltage, medium amperage heater having a power input of 28 kilowatts. The arc heater was operated at between 24–28 kilowatts. Hydrogen in the amount of 300 SCFH was introduced into the arc heater as the plasma gas. Gaseous titanium tetrachloride in the amount of 18.7 grams per minute, together with hydrogen as the carrier gas in the amount of 20 SCFH, was introduced through the top slot of the reactant inlet assembly means. Gaseous boron trichloride, in the amount of 26.9 grams per minute with an argon carrier gas in the amount of 22 SCFH was introduced through the bottom slot of the assembly means. The run continued for 95½ minutes and titanium diboride having a B.E.T. surface area of about 14 square meters per gram was obtained. Titanium diboride deposits on the bottom lip of the reactant inlet assembly were observed at the end of the run.

Run B

The procedure of Run A was repeated except that boron trichloride was introduced through the top slot and titanium tetrachloride through the bottom slot of the reactant inlet assembly means. 25.6 grams per minute of gaseous boron trichloride with 22 SCFH argon and 18.7 grams per minute of titanium tetrachloride together with 12 SCFH of hydrogen chloride were utilized as the reactants. The run was continued for 120 minutes to produce titanium diboride, having a B.E.T. surface area of about 9.1 square meters per gram. A thin skin of titanium diboride powder deposits on the inlet assembly were observed at the end of the run. Most of the deposit was found to be attached to the bottom exposed portion of the inlet assembly, e.g., lip 46 of mixer means 30 in FIG. 1, and the exposed top lip of reactor 34.

Run C

The procedure of Run A was repeated, except that 12 SCFH of hydrogen chloride was utilized as the carrier gas for the titanium tetrachloride instead of the 20 SCFH of hydrogen and 27.8 grams per minute of boron trichloride was fed to the reactor. This run continued for 150 minutes and the titanium diboride product was found to have a B.E.T. surface area of about 5.8 square meters per gram. No growth of titanium diboride deposits on the inlet assembly means was observed.

Run D

The procedure of Run C was repeated, except that the titanium tetrachloride feed rate averaged about 21 grams per minute and the boron trichloride feed rate averaged about 29.8 grams per minute. This run continued for 975 minutes and the titanium diboride product had a B.E.T. surface area of about 6.3 square meters per gram. No growth of titanium diboride deposits on the reactant inlet assembly means was observed at the end of the run.

In all of the above runs, the powder product obtained was calcined in the presence of hydrogen at 1000° C. to degasify the product. Some of the calcined products remained pyrophoric.

Run E

Run D was repeated except that 23 SCFH of hydrogen was added to the titanium tetrachloride reactant introduced through the top slot of the reactant inlet assembly means. The titanium tetrachloride and hydrogen chloride reactant addition rates averaged 19.2 grams per minute and 2.5 SCFH, respectively. Boron trichloride in the amount of 27.0 grams per minute together with 22 SCFH argon was introduced through the bottom slot of the reactant inlet assembly means. This run continued for 1,072 minutes and produced titanium diboride having a B.E.T. surface area of about 14.1 square meters per gram.

Examples I–III show that submicron titanium diboride can be produced by the vapor phase reaction of titanium halide and a boron source compound with or without a carbon source reactant. The submicron titanium diboride powder produced is composed of well formed, individual crystals of titanium diboride. Typical scanning and transmission electron micrographs of such titanium diboride is shown in FIGS. 3 and 4 which are described in more detail hereinbefore.

EXAMPLE IV

Apparatus similar to FIG. 1, which is described in Example III, Run A, was used to prepare zirconium diboride. Hydrogen in the amount of 300 SCFH was introduced into and heated by the medium voltage, medium amperage arc heater. Gaseous zirconium tetrachloride, at a rate of 20.5 grams/minute, and 100 SCFH argon were introduced through the bottom slot of the reactant inlet assembly into the hot hydrogen stream emanating from the arc heater. Gaseous boron trichloride, at a rate of 4.93 liters/minute (a 25 percent stoichiometric excess based on zirconium tetrachloride), and 22 SCFH of argon were introduced through the top slot of the reactant inlet assembly. The process was continued for 42 minutes. The zirconium diboride product recovered had a B.E.T. surface area of 7.7 square meters per gram.

The procedure and apparatus of Example IV can be used to prepare finely-divided, submicron hafnium diboride by substituting hafnium tetrachloride for the zirconium tetrachloride of Example IV. A product similar in size and surface area to the zirconium diboride of Example IV can be expected.

EXAMPLE V

Apparatus analogous to that used in Example I was used to prepare titanium diboride. 300 SCFH of hydrogen was used as the plasma gas. Propane (89 standard cc/minute), and 45 SCFH hydrogen as a carrier gas were introduced into the reactor through the top slot of the three-slot reactant inlet assembly means. Titanium tetrachloride (52 grams/minute) together with 9 SCFH of hydrogen and 24 SCFH of hydrogen chloride were introduced through the middle slot, and boron trichloride (13,000 standard cc./minute) and 22 SCFH of argon were introduced through the bottom slot of the inlet assembly. Titanium diboride powder product was recovered and degassed under a hydrogen flow of 11 SCFH at 600° C. for 4¾ hours. The titanium diboride powder product had an elemental analysis of 31.9 percent boron, 0.09 percent oxygen, 0.78 percent carbon and 0.088 percent chlorine, and had a B.E.T. surface area of about 6.4 m²/gram.

EXAMPLE IV

Apparatus analogous to that used in Example V was used to prepare titanium diboride. 300 SCFH of hydrogen was used as the plasma gas. Titanium tetrachloride in the amount of about 41.5 grams/minute, 9 SCFH of hydrogen and 24 SCFH of hydrogen chloride were introduced into the reactor through the top slot of the three-slot reactant inlet assembly means. About 22 SCFH of hydrogen was introduced through the middle slot; and, boron trichloride in the amount of about 10,700 standard cc./minute (about a 10 percent stoichiometric excess) and about 22 SCFH of argon were introduced through the bottom slot of the inlet assembly. Titanium diboride powder was recovered and degassed under hydrogen at 600° C. for 3 hours. The titanium diboride powder product had an elemental analysis of 32.3 percent boron, 0.44 percent oxygen and 0.03 percent chlorine, and had a B.E.T. surface area of 3.3 m²/gram.

EXAMPLE VII

The procedure of Example VI was repeated and titanium diboride powder having an elemental analysis of 32.3 percent boron, 0.60 percent oxygen and 0.10 percent chlorine was recovered. The product had a B.E.T. surface area of 4.5 m²/gram.

The following examples illustrate the utility of the refractory metal borides.

EXAMPLE VIII

A portion of the titanium diboride powder of Example V was hot pressed at about 2100° C. and 3500 pounds per square inch into a plate 2 inches×2 inches×½ inch. The plate had a density of 97 percent of the theoretical density of $TiB_2$ and a resistivity of about 7 microhm centimeters. The plate was analyzed for oxygen, which was found to be about 0.05 percent. The plate was operated as a cathode in an aluminum reduction cell for 100 hours at 960° C. at an anode current density of 6.5 amperes/inch². At the end of the test period, the plate was removed, fractured, and inspected. No deterioration of the plate and no penetration of electrolyte into the plate was observed. Fracture of the plate was observed to be primarily transgranular.

Figure 6:
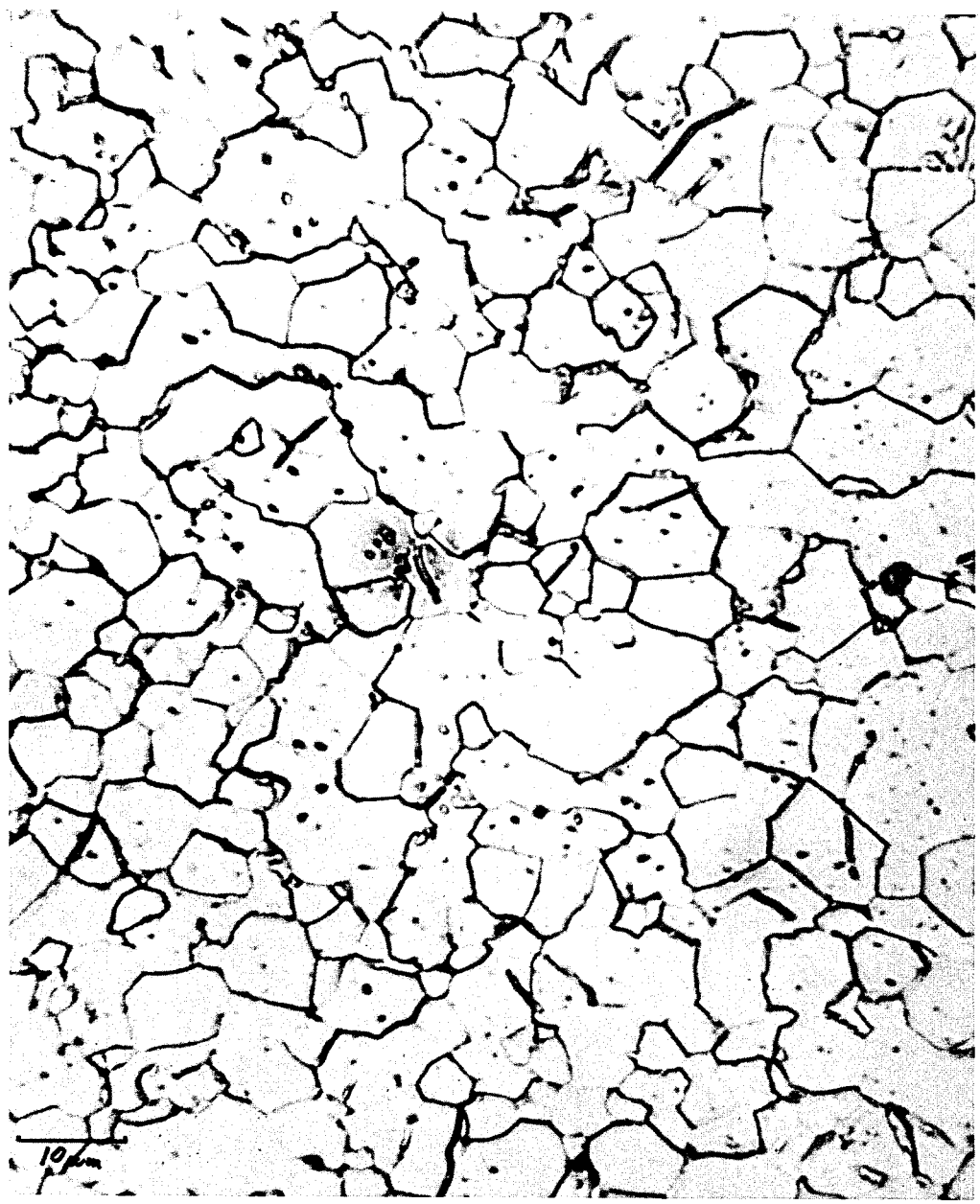
FIG. 6 is a photomicrograph, having a magnification factor of 2100, of a polished etched section of the hot pressed plate of Example VIII.

A piece of the test plate was cut out after the test was completed and polished and etched. FIG. 6 is a photomicrograph, having a magnification factor of 2100, of a polished and etched section of the plate. The microstructure of FIG. 6 shows a mosaic of equidimensional $TiB_2$ grains with contiguous grain boundaries and a limited grain size range. The $TiB_2$ grains range from about one to fifteen microns in diameter; but, are predominantly in the four to twelve micron range in size. Titanium carbide occurs as occlusions less than one micron in size within the titanium diboride grains.

EXAMPLE IX

A blend of the titanium diboride powders of Examples VI and VII in a weight ratio of about 58.5/41.5 was mixed with about 5 weight percent of titanium carbide powder having a B.E.T. surface area of about 4.5 m²/gram. The titanium carbide powder was prepared in accordance with the procedures described in U.S. Pat. No. 3,485,586. The titanium diboride and titanium carbide powders were mixed with 1 percent paraffin wax in 1,1,1-trichloroethane with a high speed Cowles mixer. The blended mixture was vacuum dried and hot pressed at about 2000° C. and 3500 pounds per square inch into a 2 inch×2 inch×½ inch plate. The plate was allowed to cool overnight in the mold under vacuum. The plate had a density of about 93 percent of the theoretical density of $TiB_2$ and was found to have an oxygen content of about 0.33 percent. The electrical resistivity of the plate was 6 microhm centimeters. The plate was operated as a cathode in an aluminum reduction cell under the same conditions as recited in Example VIII. At the end of the test period, the plate was removed, fractured and inspected. Some minor spalling and erosion of the plate had taken place; but, no penetration of the electrolyte into the plate was observed. Fracture of the plate was observed to be primarily transgranular.

Figure 5:
FIG. 5 is a photomicrograph, having a magnification factor of 2100, of a polished etched section of the hot pressed plate prepared in Example IX.

A piece of the test plate was cut out after the test was completed and polished and etched. FIG. 5 is a photomicrograph, having a magnification factor of 2100 of a polished and etched section of the plate. The microstructure of FIG. 5 is fine and shows interlocking grains of white, lath-shaped $TiB_2$ with grey TiC grains dispersed in the structure. The $TiB_2$ grains range in size from less than one micron to five microns. TiC grains are up to three microns in diameter.

EXAMPLE X

A blend of 95 parts of titanium diboride powder prepared in a manner similar to Example III Run E and 5 parts of titanium carbide powder was mixed with about 1 percent paraffin wax in 1,1,1-trichloroethane and ball milled for about one hour. The titanium diboride powder had a B.E.T. surface area of 4.9 m²/gram and the titanium carbide powder had a B.E.T. surface area of about 5.0 m²/gram. The blended mixture was vacuum dried and isostatically pressed at about 20,000 pounds per square inch into a cylindrical rod 1½ inch in diameter×16⅜ inches long. A well ⅜ inch in diameter and about 15 inches deep was drilled out of the rod and the resulting rod was vacuum sintered at about 1900° C. for about 1 hour. The rod had a density of 95 percent of the theoretical density of $TiB_2$. The sintered rod was tested as a thermocouple well in an aluminum reduction cell. The rod showed excellent thermal shock resistance and resistance to the bath.

EXAMPLE XI

Figure 7:
FIG. 7 is a photomicrograph, having a magnification factor of 2100, of a polished etched section of the isostatically pressed and sintered rod prepared in Example XI from 7.0 square meters per gram titanium diboride.

Rods similar to that of Example X were prepared using titanium diboride powder having B.E.T. surface areas of 6.6 m²/gram and 7.0 m²/gram. The sintered rods had densities of 96 percent and greater than 99 percent of the theoretical density of $TiB_2$ respectively. A piece of the rod prepared with 7.0 m²/gram titanium diboride was polished and etched. FIG. 7 is a photomicrograph, having a magnification factor of 2100, of a polished and etched section of the rod. The microstructure of FIG. 7 shows a mosaic of relatively equidimensional $TiB_2$ grains with the light-grey TiC predominantly localized in interstices between $TiB_2$ grains or occurring as occlusions within the $TiB_2$ grains. Electron microprobe analysis has indicated that a gold color induced in the TiC signifies scavenging of oxygen and nitrogen to produce a solid solution phase represented by Ti (C,O,N).

EXAMPLE XII

Titanium diboride powder prepared in a manner similar to Example V and having a B.E.T. surface area of 24 m²/gram and 0.46 percent carbon was isostatically pressed at 20,000 pounds per square inch into a cylindrical rod. The rod was vacuum sintered at about 2000° C. for about 30 minutes. The sintered rod, which had dimensions of about 1 inch×5 inches, had a density of about 98 percent of the theoretical density of $TiB_2$ and a resistivity of about 9 microhm centimeters.

Figure 8:
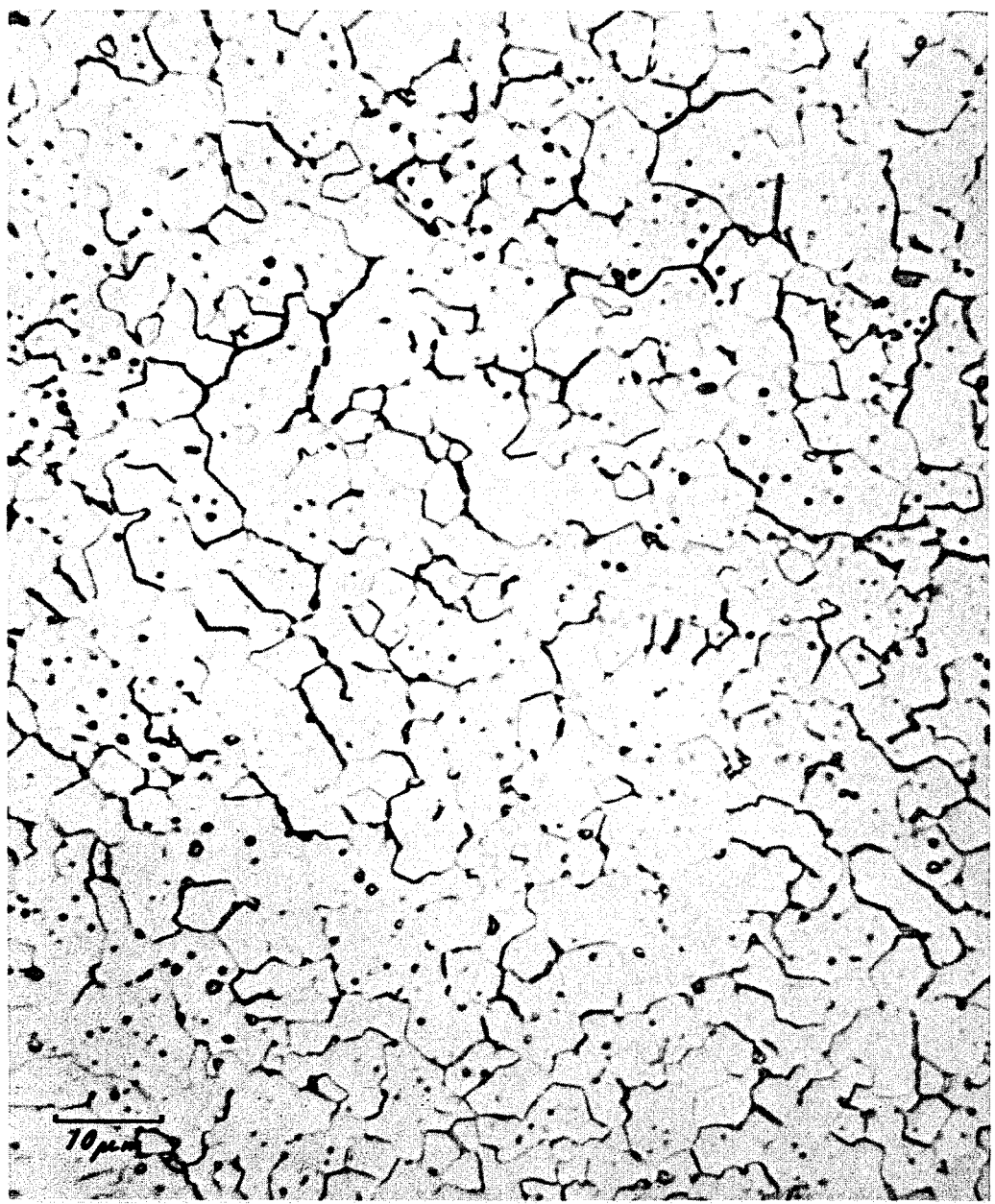
FIG. 8 is a photomicrograph, having a magnification factor of 2100, of a polished etched section of the isostatically pressed and sintered rod of Example XII.

A piece of the rod was polished and etched. FIG. 8 is a photomicrograph, having a magnification factor of 2100, a polished and etched section of the rod. The microstructure of FIG. 8 shows a mosaic of equidimensional $TiB_2$ grains with contiguous grain boundaries and a limited grain size range. The $TiB_2$ grains are predominantly three to ten microns in diameter. The Ti(C,O,N) phase occurs as occlusions less than one micron in size within the $TiB_2$ grains.

EXAMPLE XIII

Submicron carbon-containing titanium diboride powder was prepared by vapor phase reaction of titanium tetrachloride, boron trichloride, and 1,1,2-trichloroethane in the presence of hydrogen heated by a plasma arc heater and in the substantial absence of oxygen. The powder had a surface area of 5.9 m²/gram and the following chemical analysis: Titanium-68.5 percent, Boron-30.4 percent, Total carbon-0.71 percent, Free carbon-0.58 percent, Oxygen-0.09 percent, and Chlorine-0.12 percent. This powder was coated with about 1.7–1.8 percent of Gulfwax 27.

The wax-coated powder was used to prepare ⅜ inch nominal diameter titanium diboride rods of 4 inches and 1.6 inches in length. These rods were prepared by cold pressing the powder at 20,000 pounds per square inch and vacuum sintering the green rods at 2100° C. for one hour.

The above rods were tested for thermal shock in the following manner. A crucible of aluminum was placed in an electric furnace equipped with a cover and hollow vertical quartz tube. The upper portion of the quartz tube was surrounded by an electric heater. The crucible was centered below the axis of the quartz tube and was equipped with a thermocouple. The aluminum in the crucible was heated to about 750° C. The rod to be tested was wrapped with Nichrome wire and suspended in the upper section of the quartz tube heated by the electric heater until the rod attained the desired temperature. The rod was then lowered quickly into the molten aluminum and held there for 2 minutes. The rod was then removed from the molten aluminum and held above the crucible for 2 minutes to permit the aluminum to drain and then slowly raised through the quartz tube over about 30–40 minutes to permit the rod to cool slowly. When the rod was removed from the quartz tube, solidified aluminum adhering to the Nichrome wire was removed and the rod inspected for cracks.

Data obtained for the rod and the thermal shock test are reported in Table I.

TABLE I

| Rod | Size | Preparation Method | Preparation Temp. °C. | Density, % | Resistivity Microhm-cm. | Temp. Diff. | Comment |
|---|---|---|---|---|---|---|---|
| A | ¾" × 4" | CP[a] | 2100 | 98.7 | 7.7 | 287 | cracked |
| B | " | " | " | 98.8 | 8.0 | 350 | not cracked[b] |
| C | " | " | " | 98.7 | 8.1 | 350 | cracked |
| D | " | " | " | 98.8 | 8.0 | 350 | cracked |
| E | ¾" × 1.6" | " | " | 98.7 | 8.0 | 350 | cracked |
| F | " | " | " | 98.8 | 8.3 | 350 | not cracked[c] |

[a]Cold pressed
[b]Only lower half of rod immersed in aluminum due to contact with thermocouple.
[c]Only partially immersed in the aluminum.

EXAMPLE XIV

The wax-coated powder of Example XIII was used to prepare titanium diboride rods of the dimensions described in Example XIII except that the cold pressed rods were sintered at 2200° C. These rods were also tested for thermal shock resistance in the manner described in Example XIII. Data for such rods are reported in Table II.

TABLE II

| Rod | Size | Preparation Method | Preparation Temp. °C. | Density, % | Resistivity Microhm-cm. | Temp. Diff. | Comment |
|---|---|---|---|---|---|---|---|
| G | ¾" × 4" | CP[a] | 2200 | 98.8 | 11.7 | 350 | not cracked |
| H | " | " | " | 98.8 | 11.2 | 350 | not cracked |
| I | " | " | " | 98.7 | 11.6 | 450 | not cracked |
| J | " | " | " | 98.7 | 11.2 | 550 | not cracked |
| K | " | " | " | 98.7 | 10.8 | 725[d] | not cracked |
| L | ¾" × 1.6" | " | " | 99.1 | 12.2 | 725 | not cracked |

[a]Rod not preheated.

The data of Examples XIII and XIV (Tables I and II) show that the titanium diboride rods cold pressed and sintered at 2200° C. were more resistant to thermal shock cracking than rods sintered at 2100° C. The data of Table II show that the rods were resistant to thermal shock cracking to at least a temperature difference of 725° C.

A cross-section of rod L was ground, polished and etched. Examination of a photomicrograph having a magnification factor of 1500 of that cross-section evidenced a homogeneous microstructure with a well developed system of microcracks predominantly along the grain boundaries. The ASTM porosity was estimated to be A-3, B-3. Some of the B-3 porosity was believed to be due to plucking of grains during polishing. The predominant grain size was in the range of 5 to 50 microns.

EXAMPLE XV

The wax-coated powder of Example XIII was used to prepare hot pressed ¾ inch nominal diameter titanium diboride rods 1.6 inches in length. Before hot pressing the rod, the mold, which had been filled with the powder, was placed in a vacuum furnace to dewax the powder. The temperatures used to press the rods varied from 2050° C. to 2200° C. The rods prepared at 2050° C. were hot pressed in an atmosphere of about one pound positive pressure of hydrogen. These rods were tested for thermal shock resistance in the manner described in Example XIII. Data collected for such rods are reported in Table III.

TABLE III

| Rod | Size | Preparation Method | Preparation Temp. °C. | Density, % | Resistivity Microhm-cm. | Temp. Diff. | Comment |
|---|---|---|---|---|---|---|---|
| M | ¾" × 1.6" | HP[e] | 2100 | 97.7 | 8.4 | 350 | cracked |
| N | " | " | " | 97.8 | 8.3 | 340 | cracked |
| O | " | " | 2200 | 98.1 | 18.8 | 725 | not cracked[f] |
| P | " | " | 2200 | 96.4 | 16.2 | 725 | not cracked[f] |
| Q | " | " | 2050-H$_2$ | 89.0 | 12.7 | 725 | cracked |
| R | " | " | 2050-H$_2$ | 88.6 | 11.0 | 725 | cracked |

[e]Hot Pressed
[f]Only partially immersed in the aluminum.

The data of Table III show that the rods which were hot pressed at 2200° C. were more thermal shock resistant than those prepared at 2100° C. or at 2050° C. in a hydrogen atmosphere. The rods hot pressed at 2200° C. were resistant to thermal shock cracking to at least a temperature difference of 725° C. Moreover, the rods hot pressed in hydrogen (Rods Q and R) did not densify to as high a density as rods hot pressed in the absence of hydrogen.

A cross-section of rod O was ground, polished and etched. Examination of a photomicrograph having a magnification factor of 1500 of that cross-section evidenced a homogeneous microstructure with a well developed system of microcracks predominantly along the grain boundaries. The predominant grain size was in the 10–75 micron range. The ASTM porosity was estimated to be A-2, B-3. Some of the B-3 porosity was believed to be due to plucking of grains during polishing.

A cross-section of rod Q was ground, polished and etched. Examination of a photomicrograph having a magnification factor of 1500 of that cross-section evidenced the level of densification reported in Table III, i.e., 89 percent. The microstructure was composed of highly dense, fine grained, irregular domains that appeared to be relicts of the powder agglomerates. The porosity observed in the microstructure was largely due to voids between the dense domains. The photomicrograph indicates that densification by hot pressing in the presence of hydrogen differs from that obtained by hot pressing in the absence of hydrogen, e.g., in a vacuum.

EXAMPLE XVI

A sample of titanium diboride powder, which was believed to be prepared by the carbothermic process, was purchased and analyzed. About 400 grams of this sample was milled in a titanium diboride mill equipped with titanium diboride grinding pellets for 101.5 hours using liquid heptane as a grinding medium. The milled powder was separated from the liquid heptane and vacuum dried to evaporate heptane adhering to the powder. The dried powder was stored in a dry box in which the oxygen and water levels were controlled to less than about 2 ppm and less than about 10 ppm respectively and screened through a 20 Tyler mesh sieve to break up any agglomerates present. The milled powder was analyzed and data for the milled and as received powder are reported in Table IV.

TABLE IV

| | Purchased Carbothermic $TiB_2$ Powder | |
|---|---|---|
| | As received | Milled |
| Titanium, % | 68.6 | 67.5 |
| Boron, % | 29.9 | 30.8 |
| Total Carbon, % | 0.26 | 0.42 |
| Free Carbon, % | 0.08 | 0.18 |
| Oxygen, % | 0.43 | 1.02 |
| Nitrogen, % | — | 0.02 |
| Iron, % | 0.46 | 0.44 |
| Surface Area, $m^2$/gram | 0.1 | 2.7 |
| Weight mean diameter, microns | | 4.05g | gAs determined by Zeiss Particle Size Analyzer

EXAMPLE XVII

The milled titanium diboride powder of Example XVI was used to prepare hot pressed ¾ inch nominal diameter titanium diboride rods 1.6 inches in length. The rods were pressed at 2050° C. in a hydrogen atmosphere as described in Example XV. The rods were tested for thermal shock resistance in the manner described in Example XIII. Data for such rods were reported in Table V.

TABLE V

| Rod | Size | Preparation Method | Temp. °C. | Density, % | Resistivity Microhm-cm. | Temp. Diff. | Comment |
|---|---|---|---|---|---|---|---|
| S | ¾" × 1.6" | $HP^e$ | 2050-$H_2$ | 90.3 | 26.7 | 725 | not cracked |
| T | " | " | 2050-$H_2$ | 88.8 | 25.5 | 725 | cracked |
| U | " | " | 2050-$H_2$ | 89.2 | 23.9 | 725 | cracked |

The data of Table V show that rods prepared from hot pressed milled carbothermic $TiB_2$ powder is not as thermal shock resistant as rods prepared by hot pressing (or cold pressing and sintering) at 2200° C. titanium diboride powder of the present invention.

A cross-section of rod S was ground, polished and etched. Examination of a photomicrograph having a magnification factor of 1500 of that cross-section evidenced a structure similar to that of rod T except that the grains were predominantly in the range of 1-8 microns. The ASTM porosity was estimated to be A-6, B-2, and a TiC phase with grains in the range of 1-5 microns was discernible. The porosity was also largely interstitial.

A cross-section of rod T was ground, polished and etched. Examination of a photomicrograph having a magnification factor of 1500 of that cross-section evidenced a structure with abundant fine porosity. The ASTM porosity was estimated to be A-6, B-1. The microstructure was predominantly fine grained with grains in the range of 1-13 microns. Many of the pores were observed to be partially filled with a Ti(O,C,N) phase, i.e., a second phase was clearly discernible. The porosity was largely interstitial, i.e., occurring largely between the grains, resulting in a structure characterized by open, intergranular porosity.

In Examples XIII-XV and XVII, the dimensions recited for the titanium diboride rods are nominal dimensions, since dimensions will vary slightly due to the use of different powders and/or different consolidation methods. For example, some of the rods that are designated as 1.6 inches in length varied up to about 0.1 inches from that dimension. Thus, it should be understood that the nominal designation of 1.6 inches is intended to mean 1.6±0.1 inches.

Although the present process has been described with reference to specific details of certain embodiments thereof, it is not intended that such details should be regarded as limitations upon the scope of the invention except as and to the extent that they are included in the accompanying claims.

I claim:

1. Submicron titanium diboride powder having dispersed therein solid submicron carbon-containing additive selected from the group elemental carbon, titanium carbide and mixtures of elemental carbon and titanium carbide, the total carbon content of said additive being from about 0.3 to about 2 weight percent based on titanium diboride, and wherein the titanium diboride powder has a surface area of between about 3 and 15 square meters per gram and the nominal sectional diameter of at least 90 percent of the titanium diboride particles of the powder are less than one micron, said particles being tabular to equidimensional hexagonal crystals having well developed faces, the number median particle size of said particles being between 0.08 and 0.6 microns.

2. The powder of claim 1 wherein the surface area of the titanium diboride powder is between about 3 and 15 square meters per gram.

3. The powder of claim 2 wherein at least 60 percent of the titanium diboride particles have a nominal sectional diameter of 0.7 microns or less.

4. The powder of claim 2 wherein the ratio of the nominal sectional diameter to thickness of the titanium diboride tabular crystals is from 1.5:1 to 10:1.

5. The powder of claim 4 wherein the total carbon content of the additive is from about 0.3 to 1 weight percent.

6. The powder of claim 5 wherein the carbon-containing additive and titanium diboride are coproduced by vapor phase reaction of titanium halide, boron source and carbon source reactants in the presence of hydrogen.

7. The powder of claim 6 wherein the titanium diboride powder contains less than 0.25 weight percent oxygen.

8. The powder of claim 7 wherein the titanium diboride powder contains less than 0.20 weight percent halogen as determined by X-ray spectrographic analysis.

9. The powder of claim 8 wherein the titanium diboride powder contains less than 0.4 weight percent metal impurities.

10. The powder of claim 7 wherein the titanium halide is titanium tetrachloride, the boron source is boron trichloride, and the titanium diboride powder contains less than 0.20 weight percent chlorine as determined by X-ray spectroscopic analysis and less than 0.4 weight percent metal impurities.

11. The powder of claim 10 wherein the surface area of the titanium diboride powder is from about 5 to about 10 square meters per gram.

12. A dense titanium diboride article of manufacture consisting essentially of titanium diboride and carbon-containing additive selected from the group consisting essentially of elemental carbon, titanium carbide and mixtures of elemental carbon and titanium carbide, the total carbon content of said additive being from about 0.3 to about 2 weight percent based on titanium diboride, said article having a density of at least 90 percent of the theoretical density for titanium diboride, essentially closed porosity in the form of substantially submicron intragranular pores that are essentially uniformly distributed throughout the article, and a microstructure of substantially equidimensional grains with contiguous grain boundaries.

13. The article of claim 12 wherein the total carbon content of the additive is from about 0.3 to about 1 weight percent.

14. The article of claim 13 wherein the density is at least 95 percent of the theoretical density for titanium diboride.

15. The article of claim 13 wherein the density is at least 98 percent of the theoretical density for titanium diboride.

16. A dense titanium diboride article of manufacture consisting essentially of titanium diboride and carbon-containing additive selected from the group consisting of titanium carbide, elemental carbon and mixtures thereof, the total carbon content of said additives being from about 0.3 to about 2 weight percent based on titanium diboride, said article having a density of at least 93 percent of the theoretical density for titanium diboride, essentially closed porosity in the form of substantially submicron intragranular pores that are essentially uniformly distributed throughout the article, and a microstructure of substantially equidimensional grains with contiguous grain boundaries.

17. The article of claim 16 wherein the total carbon content of the additive is between about 0.3 and about 1 weight percent.

18. The article of claim 17 wherein the microstructure is characterized by a predominantly fine grain size.

19. The article of claim 17 wherein the density is at least 98 percent of the theoretical density for titanium diboride and the article is substantially impermeable to molten aluminum.

20. The article of claim 19 wherein the electrical resistivity is less than 10 microhm centimeters.

21. The article of claims 12, 16, 17 or 19 wherein said article is a current conducting element.

22. The article of claims 16, 17 or 19 wherein said article is a cathodic element in an electrolytic cell for the production of aluminum.

23. A cold formed and sintered dense titanium diboride article of manufacture consisting essentially of titanium diboride and carbon-containing additive selected from the group consisting of titanium carbide, elemental carbon and mixtures thereof, the total carbon content of said additives being from about 0.3 to about 2 weight percent based on titanium diboride, said article having a density of at least 93 percent of the theoretical density for titanium diboride, essentially closed porosity in the form of substantially submicron intragranular pores that are essentially uniformly distributed throughout the article, and a microstructure of substantially equidimensional grains with contiguous grain boundaries.

24. The cold formed and sintered article of claim 23 wherein the total carbon content of the additive is between about 0.3 and about 1 weight percent.

25. A cold formed and sintered dense titanium diboride article of manufacture consisting essentially of titanium diboride and coproduced carbon-containing additive selected from the group consisting of titanium carbide, elemental carbon and mixtures thereof, said additive being coproduced by vapor phase reaction of titanium halide, boron source and carbon source reactants in the presence of hydrogen, the total carbon content of said additives being from about 0.3 to about 2 weight percent baed on titanium diboride, said article having a density of at least 93 percent of the theoretical density for titanium diboride, essentially closed porosity in the form of substantially submicron intragranular pores that are essentially uniformly distributed throughout the article, and a microstructure of substantially equidimensional grains with contiguous grain boundaries.

26. The cold formed and sintered article of claim 25 wherein the total carbon content of the additive is between about 0.3 and about 1 weight percent and wherein the microstructure is composed of predominantly fine grains of essentially a single phase.

27. A thermal shock resistant dense titanium diboride article of manufacture consisting essentially of titanium diboride and carbon-containing additive selected from the group consisting of titanium carbide, elemental carbon and mixtures thereof, the total carbon content of said additive being from about 0.3 to about 1 weight percent based on titanium diboride, said article having a density of at least 95 percent of the theoretical density for titanium diboride, essentially closed porosity in the form of substantially submicron intragranular pores that are essentially uniformly distributed throughout the article, and a microstructure of substantially equidimensional grains of essentially a single phase with contiguous grain boundaries, said microstructure having discernible submicron microcracks at the grain boundaries.

28. The article of claim 27 wherein the density is at least 98 percent.

* * * * *

UNITED STATES PATENT AND TRADEMARK OFFICE
CERTIFICATE OF CORRECTION

PATENT NO. : 4,266,977
DATED : May 12, 1981
INVENTOR(S) : Roger A. Steiger

It is certified that error appears in the above-identified patent and that said Letters Patent are hereby corrected as shown below:

Column 34, line 40, "claim 4" should be --claim 1--.

Column 36, line 23, "baed" should be --based--.

Signed and Sealed this

Seventeenth Day of November 1981

[SEAL]

Attest:

GERALD J. MOSSINGHOFF

Attesting Officer     Commissioner of Patents and Trademarks